US008313707B2

(12) United States Patent
Limback et al.

(10) Patent No.: US 8,313,707 B2
(45) Date of Patent: Nov. 20, 2012

(54) SOLID PRODUCT DISPENSER

(75) Inventors: Scott R. Limback, St. Paul, MN (US); Thomas P. Berg, Greensboro, NC (US); Kristine J. Williams, Oak Ridge, NC (US); Brian P. Carlson, St. Paul, MN (US)

(73) Assignee: Ecolab USA Inc., St. Paul, MN (US)

(*) Notice: Subject to any disclaimer, the term of this patent is extended or adjusted under 35 U.S.C. 154(b) by 0 days.

(21) Appl. No.: 13/104,332

(22) Filed: May 10, 2011

(65) Prior Publication Data

US 2011/0210139 A1 Sep. 1, 2011

Related U.S. Application Data

(62) Division of application No. 11/487,168, filed on Jul. 14, 2006, now Pat. No. 7,988,929.

(60) Provisional application No. 60/795,340, filed on Apr. 27, 2006.

(51) Int. Cl.
*B01D 11/02* (2006.01)
*B05B 1/36* (2006.01)

(52) U.S. Cl. ........................................ 422/264; 239/193

(58) Field of Classification Search .................. 422/264; 221/282; 239/193, 194; 222/108–111
See application file for complete search history.

(56) References Cited

U.S. PATENT DOCUMENTS 2,371,720 A 3/1945 Stine
4,462,511 A * 7/1984 Fulmer et al. .................. 222/52
4,817,825 A 4/1989 Freese
4,826,661 A 5/1989 Copeland et al.
4,842,166 A 6/1989 Van Zijverden
D334,420 S 3/1993 Gladfelter et al.
5,194,230 A 3/1993 PeKarna et al.
5,268,153 A 12/1993 Muller
5,427,748 A 6/1995 Wiedrich et al.
5,478,537 A 12/1995 Laughlin et al.
D385,494 S 10/1997 Balz et al.
D385,496 S 10/1997 Balz et al.
D385,799 S 11/1997 Balz et al.
D387,285 S 12/1997 Balz et al.
5,827,486 A 10/1998 Crossdale
5,846,499 A 12/1998 Laughlin et al.
D406,635 S 3/1999 Russell et al.
D407,463 S 3/1999 Outlaw et al.
D414,895 S 10/1999 Olson et al.
6,109,480 A 8/2000 Monsrud et al.
D449,881 S 10/2001 Mock, Sr.
6,572,258 B1 6/2003 Holland
(Continued)

FOREIGN PATENT DOCUMENTS

EP 0231603 A1 8/1987
EP 0 249 440 A2 12/1987
GB 2 306 302 A 5/1997

*Primary Examiner* — Kevin Joyner
(74) *Attorney, Agent, or Firm* — IPLM Group, P.A.

(57) ABSTRACT

A product housing for use with a vacuum breaker, a solid product dispenser, and a solid product having a bottom surface comprises a product holder, an overflow outlet, and a flood plane. The product holder has a bottom and is configured and arranged to receive the solid product with the bottom surface proximate the bottom. The bottom of the product holder is positioned proximate above the solid product dispenser and proximate below the vacuum breaker. The overflow outlet is proximate the bottom, and the flood plane is proximate the overflow outlet.

20 Claims, 19 Drawing Sheets

U.S. PATENT DOCUMENTS

| | | | |
|---|---|---|---|
| 6,773,668 | B1 | 8/2004 | Everson et al. |
| 2002/0137657 | A1 | 9/2002 | Lant et al. |
| 2003/0168085 | A1 | 9/2003 | Sowle et al. |
| 2004/0226961 | A1 | 11/2004 | Mehus et al. |
| 2004/0253155 | A1 | 12/2004 | Fine et al. |
| 2005/0023290 | A1 | 2/2005 | Kon et al. |
| 2005/0045652 | A1 | 3/2005 | Maser |
| 2005/0121058 | A1 | 6/2005 | Furber et al. |
| 2006/0083668 | A1 | 4/2006 | Thomas et al. |
| 2006/0083669 | A1 | 4/2006 | Thomas et al. |

* cited by examiner

SOLID PRODUCT DISPENSER

This application is a divisional application of U.S. patent application Ser. No. 11/487,168, filed Jul. 14, 2006, which issued as U.S. Pat. No. 7,988,929 on Aug. 2, 2011, which claims the benefit of U.S. Provisional Patent Application 60/795,340 filed Apr. 27, 2006.

FIELD OF THE INVENTION

The present invention relates to a solid product dispenser for dispensing a solid product.

BACKGROUND OF THE INVENTION

Dispensers that utilize a diluent to erode a portion of a solid product such as an all purpose cleaning agent, a detergent, a sanitizer, a rinse aid, or any other suitable chemical from which it is desired to make a use solution are well known. The product being dispensed is typically a solid product and can take the form of either a solid block of chemicals, pellets, a cast product, or an extruded product. One example of such a dispenser is found in U.S. Pat. No. 4,826,661 by Copeland et al. This patent discloses a solid block chemical dispenser for cleaning systems. The dispenser includes a spray nozzle for directing a dissolving spray onto a surface of a solid block of a cleaning composition. The nozzle sprays on the exposed surface of the solid block, dissolving a portion of the block and forming a use solution. This is just one example of a dispenser that uses a diluent and further just one example of the type of product that may be dispensed. It is recognized that there are many different dispensers which utilize diluents to erode and dispense a portion of a product, which may also have any number of forms.

When dispensing a use solution, it is often important to maintain a certain concentration of the use solution. Prior art dispensers have done this by controlling the amount of water being sprayed on the solid product and the amount of water added to the use solution and have typically accomplished this used electronics to control the water inlet valves. Still further, when the additional diluent is added to the use solution, in prior art dispensers, there is often a problem of foaming within the dispenser, which can interfere with the spray onto the solid product and affect the concentration of the use solution.

The present invention addresses the problems associated with the prior art dispensers.

SUMMARY OF THE INVENTION

One aspect of the present invention provides a product housing for use with a solid product, a solid product dispenser, and a vacuum breaker. The solid product has a bottom surface. The product housing comprises a product holder, an overflow outlet, and a flood plane. The product holder has a bottom and is configured and arranged to receive the solid product with the bottom surface proximate the bottom. The bottom of the product holder is positioned proximate above the solid product dispenser and proximate below the vacuum breaker. The overflow outlet is proximate the bottom, and the flood plane is proximate the overflow outlet.

One aspect of the present invention provides a product housing for use with a solid product, a solid product dispenser, and a vacuum breaker. The solid product has a bottom surface. The product housing comprises a product holder, an extension flange, a base portion, and a flood plane. The product holder has a bottom and is configured and arranged to receive the solid product with the bottom surface proximate the bottom. The bottom of the product holder is positioned proximate above the solid product dispenser and proximate below the vacuum breaker. The extension flange extends downward from proximate the bottom of the product holder. The base portion is operatively connected to the bottom of the product holder and includes a support flange, a railing, and an angled portion. The support flange is configured and arranged to be supported by a top portion of the solid product dispenser. The railing extends upward from proximate the support flange. The angled portion extends upward proximate the support flange and the railing toward the product holder at an angle of approximately 38 to 46° and creates an overflow outlet proximate the bottom of the product holder. The overflow outlet is a slot having a width of approximately 0.020 to 0.045 inch and a height of approximately 0.100 to 0.130 inch. The flood plane is proximate the overflow outlet and the vacuum breaker is at least approximately 3.50 inches above the flood plane. The extension flange and the angled portion are configured and arranged to assist in preventing diluent sprayed onto the bottom surface of the solid product by the solid product dispenser from exiting the overflow outlet.

One aspect of the present invention provides a solid product dispensing assembly comprising a vacuum breaker, a solid product dispenser, a solid product having a bottom surface, and a product holder. The product holder has a bottom, an overflow outlet proximate the bottom, and a flood plane proximate the overflow outlet. The product holder is configured and arranged to receive the solid product with the bottom surface proximate the bottom, and the bottom is positioned proximate above the solid product dispenser and proximate below the vacuum breaker. The vacuum breaker is at least approximately 3.50 inches above the flood plane.

DETAILED DESCRIPTION OF A PREFERRED EMBODIMENT

Figure 1:
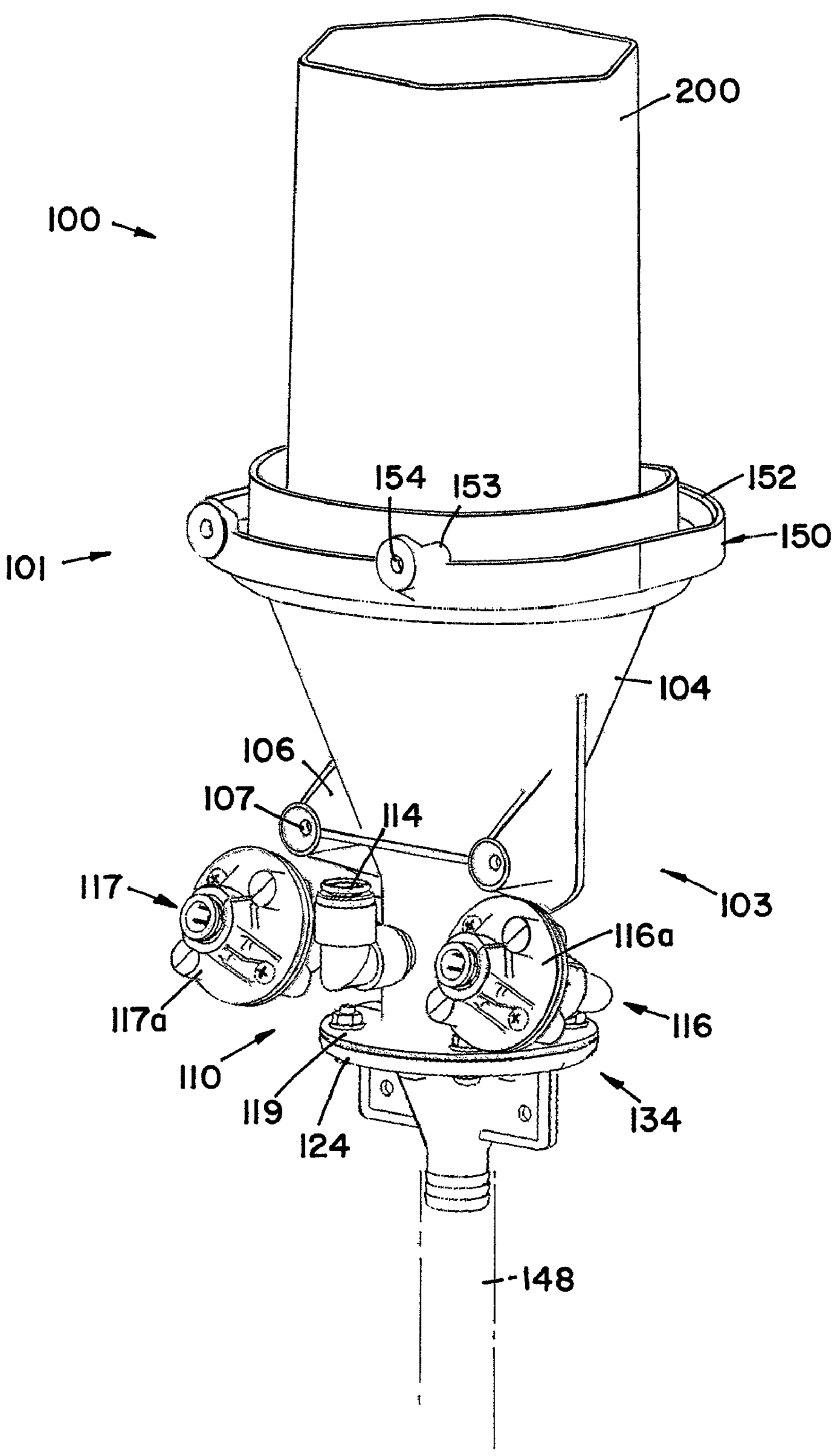
FIG. 1 is a rear perspective view of a dispenser constructed according to the principles of the present invention.
Figure 2:
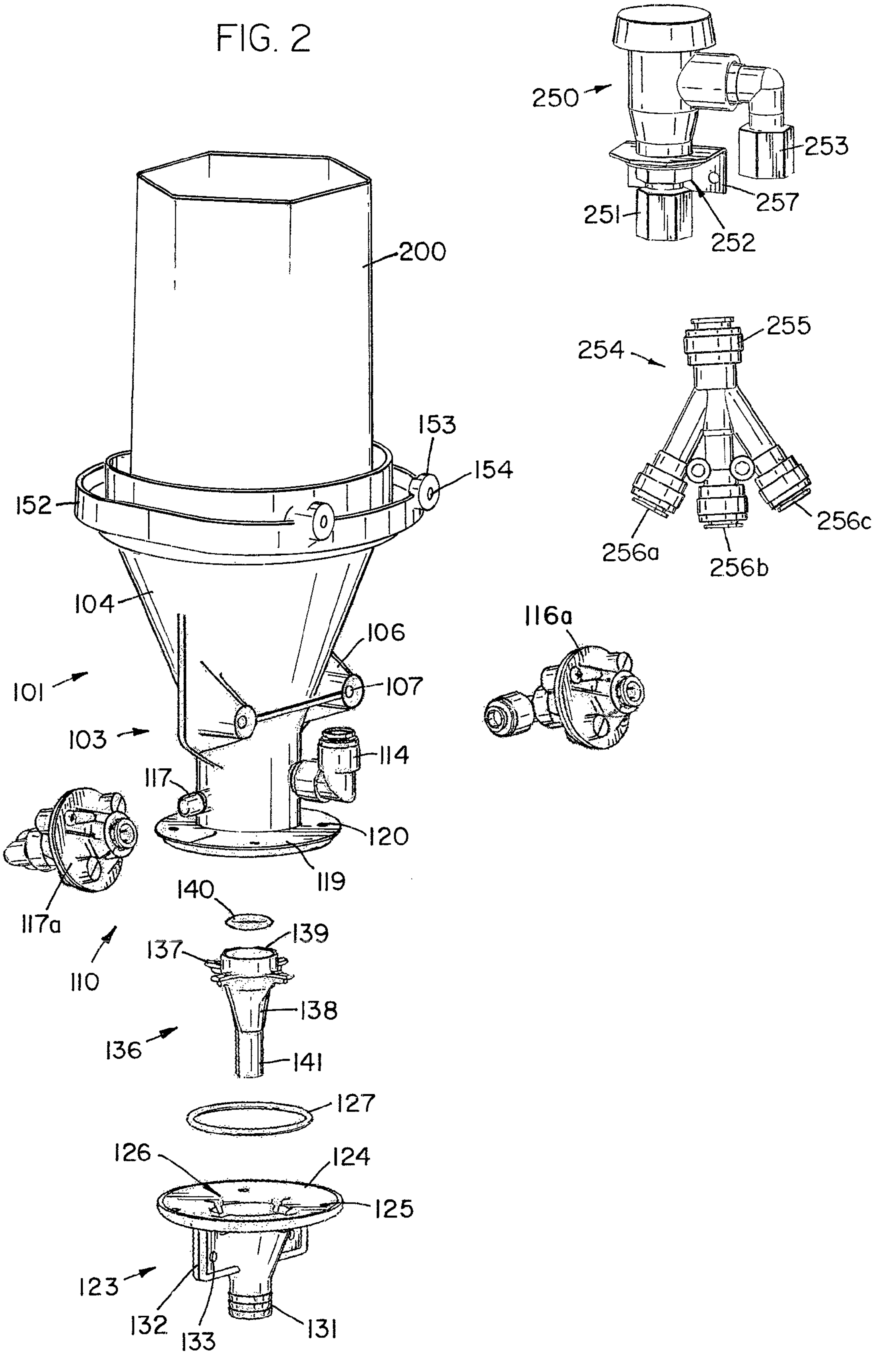
FIG. 2 is an exploded rear perspective view of the dispenser shown in FIG. 1.

A preferred embodiment dispenser constructed according to the principles of the present invention is designated by the numeral 100 in the drawings.

Figure 3:
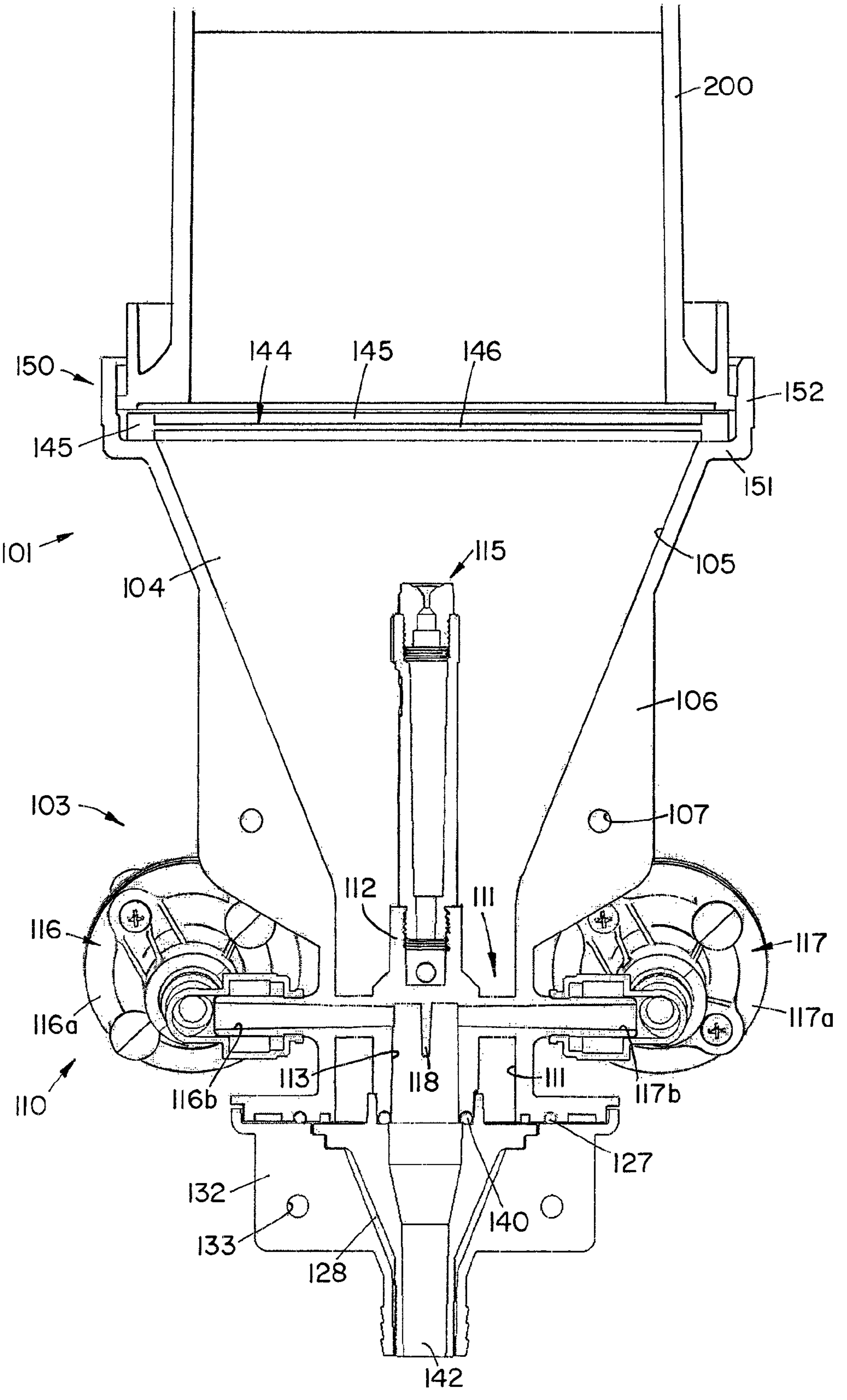
FIG. 3 is a cross-sectional view of the dispenser shown in FIG. 1.
Figure 4:
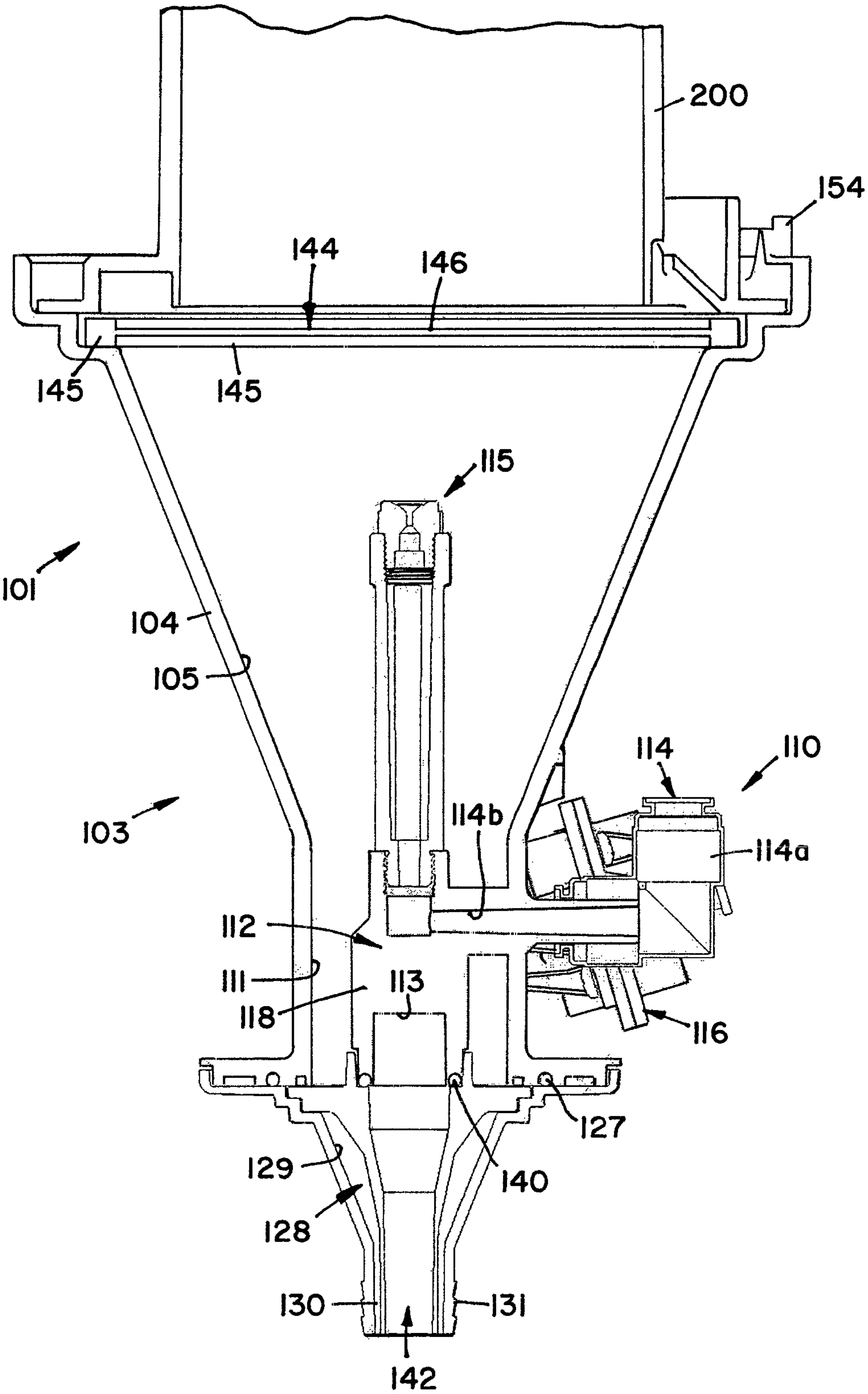
FIG. 4 is a cross-sectional view of the dispenser shown in FIG. 1 rotated ninety degrees from the cross-section shown in FIG. 3.
Figure 5:
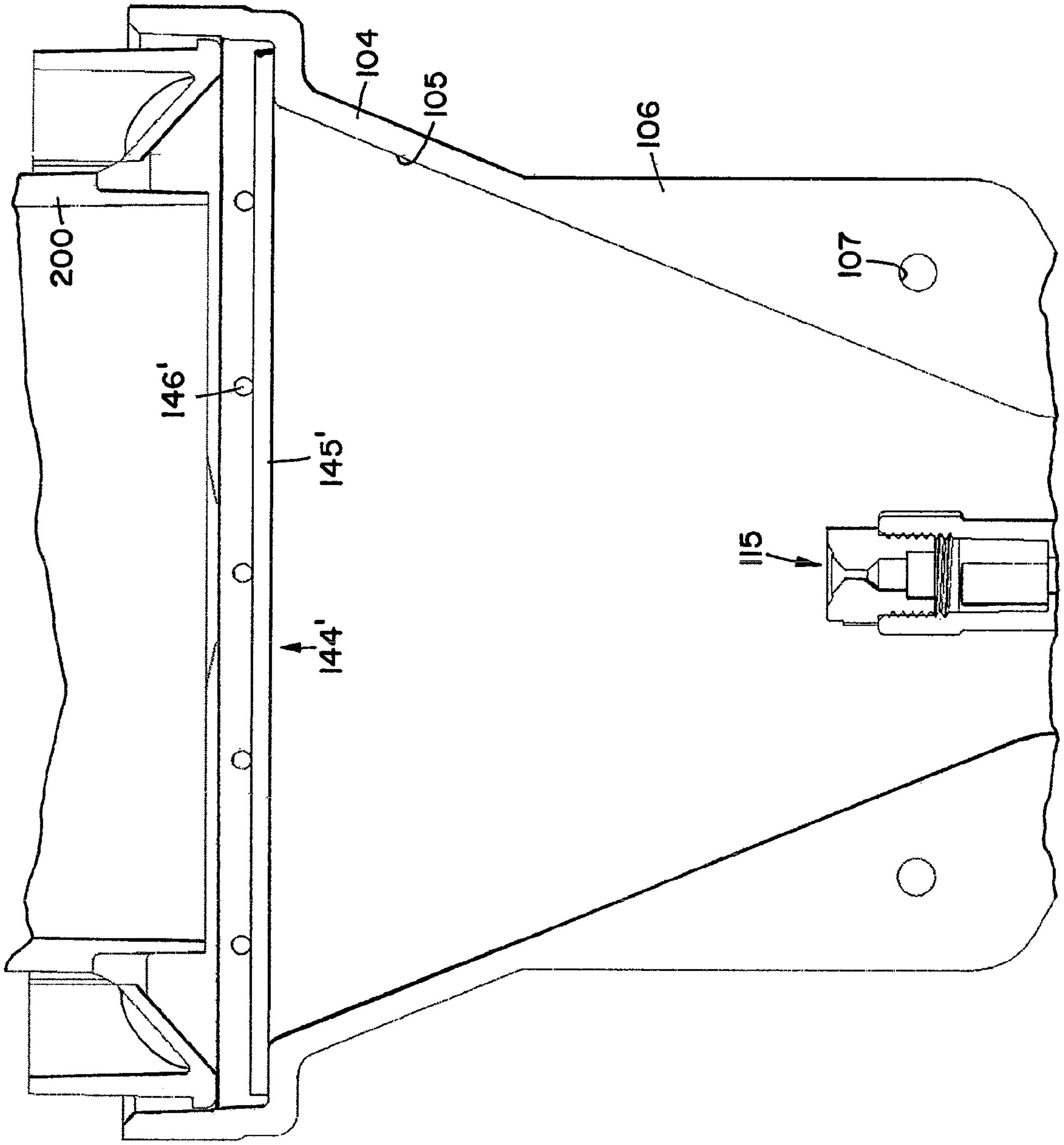
FIG. 5 is a partial cross-sectional view of the dispenser shown in FIG. 1 where a top portion and a bottom portion of the dispenser are operatively connected.

As shown in FIGS. 1-4, the dispenser 100 includes a housing 101 having a bottom portion 103 and a top portion 200. The bottom portion 103 includes a conical portion 104, an inlet portion 110, an outlet portion 123, and a diluent outlet portion 136. The conical portion 104 has a top 150 and a conical-shaped cavity 105. The top 150 is preferably round and has a perimeter surface 151 with a flange 152 extending upward from proximate the outer edge of the perimeter surface 151. Thus, the perimeter surface 151 forms a ledge around the top 150 and the flange 152 forms a railing around the perimeter surface 151. As shown in FIG. 5, a product support 144' includes elongate members 145' and 146' forming a grid supported by the perimeter surface 151 upon which product may be placed. The product support 144' supports the product and allows a diluent to be sprayed on the bottom surface of the product to create a concentrated solution. Alternatively, as shown in FIGS. 3 and 4, a screen 144 having a perimeter 145 and a mesh portion 146 may be used. Any suitable product support that allows a diluent to contact the bottom of the product may be used. An optional mounting member 153 including bores 154 may be operatively connected to one side of the top 150, and optional mounting flanges 106 including bores 107 may be operatively connected to opposing sides of an outer, bottom surface of the bottom portion 103. Fasteners (not shown) may be inserted through the bores 154 and 107 to secure the bottom portion 103 to a mounting surface (not shown) such as a wall.

The inlet portion 110 is preferably integral with the conical portion 104 thus forming with the conical portion 104 a funnel-shaped portion molded as one piece. The inlet portion 110 includes a first cavity 111 in which at least a portion of a manifold 112 having a second cavity 113 is located. The manifold 112 may be a separate component or it may be integrally formed with the housing 101. The manifold 112 includes a first passageway 114*b* and a second passageway 116*b* and may also include an optional third passageway 117*b*. The first passageway 114*b* is in fluid communication with a first inlet 114 to which a connector 114*a* is operatively connected. A spray nozzle 115 is operatively connected to the manifold 112 and is in fluid communication with the first passageway 114*b*. As shown in FIGS. 3 and 4, the spray nozzle 115 is preferably threaded into the manifold 112. A suitable spray nozzle that may be used is a full cone standard spray nozzle manufactured by AllSpray, L.L.C. in Carol Stream, Ill. The second passageway 116*b* is in fluid communication with a second inlet 116 to which a flow control 116*a* is operatively connected. The optional third passageway 117*b* is in fluid communication with a third inlet 117 to which a flow control 117*a* is operatively connected. The flow controls 116*a* and 117*a* are preferably regulators or any other suitable flow control devices. Preferably, flow control 116*a* controls the flow rate at up to 4.0 gallons per minute (hereinafter “gpm”) and the flow control 117*a* controls the flow rate at up to 4.0 gpm.

A vacuum breaker 250, preferably an atmospheric vacuum breaker, is mounted to a surface such as a wall with a bracket 257. An inlet 251 is operatively connected to a bottom 252 of the vacuum breaker 250 and receives a diluent from a diluent source such as water, and the diluent exits an outlet 253 into an inlet 255 of a splitter 254 having a first outlet 256*a*, a second outlet 256*b*, and a third outlet 256*c*. From the first outlet 256*a* the diluent flows into the inlet 116, from the second outlet 256*b* the diluent flows into the inlet 114, and from the third outlet 256*c* the diluent flows into the inlet 117.

If the third inlet 117 and the third passageway 117*b* are included, the third passageway 117*b* may be closed off or sealed proximate the second cavity 113 if it is not desired to use the third inlet 117. The manifold 112 also includes a baffle 118 extending downward proximate below the spray nozzle 115 and where the passageways 116*b* and 117*b* connect to the second cavity 113. A male connecting flange 119 including apertures 120 extends outward from the bottom of the inlet portion 110.

The outlet portion 123 is funnel-shaped and includes a funnel-shaped cavity 128 and a top 134 from which a female connecting flange 124 having apertures 125 extends. The female connecting flange 124 preferably also includes four seats 126 spaced approximately 90 degrees apart from one another around the top 134 of the outlet portion 123. The cavity 128 includes a conical portion 129 and an outlet portion 130. The outer surface of the bottom of the outlet portion 123 includes a barbed outer surface 131 for connecting an outlet tubing 148 thereto. Optional mounting flanges 132 including apertures 133 may be operatively connected to opposing sides of the outlet portion 123 proximate the conical portion. Fasteners (not shown) may be inserted through the apertures 133 to secure the outlet portion 123 to a mounting surface (not shown) such as a wall.

The diluent outlet portion 136 preferably includes four arms 137 which extend outward from a top 139 of a conical portion 138 and sit within the seats 126 of the outlet portion 123. An outlet portion 141 is preferably integral with the conical portion 138 and extends downward therefrom. The conical portion 138 and the outlet portion 141 form a cavity 142 extending longitudinally therethrough. The male connecting flange 119 sits within the female connecting flange 124 of the outlet portion 123 and the apertures 120 and 125 are in alignment. Fasteners (not shown) are inserted through the apertures 120 and 125 to secure the inlet portion 110 to the outlet portion 123. An O-ring 127 seals the male connecting flange 119 and the female connecting flange 124 proximate the first cavity 111 and the cavity 128. An O-ring 140 seals the top 139 of the diluent outlet portion 136 to the manifold 112 of the inlet portion 110 proximate the second cavity 113 and the cavity 142.

The outlet portion 123 preferably has an inner diameter, the diameter of the outlet portion 130 of cavity 128, of approximately 0.54 to 0.60 inch. The barbed outer surface 131 preferably has an outer diameter of approximately 1.0 inch to support an outlet tubing 148 with an inner diameter of approximately 0.75 inch. The diluent outlet 136 preferably has an inner diameter, the diameter of cavity 142, of approximately 0.35 to 0.41 inch. The outer diameter of the diluent outlet 136 is preferably approximately 0.45 to 0.50 inch. Therefore, there is a space between the inner diameter of the outlet portion 123 and the outer portion of the diluent outlet 136 of approximately 0.03 to 0.07 inch.

The top portion 200 is shown operatively connected to the dispenser 100, but it is recognized that top portions 160 and 180 may also be used. The top portion of the dispenser is a product holder for receiving a suitable solid product such as an all purpose cleaning agent, a detergent, a sanitizer, a rinse aid, or any other suitable chemical from which it is desired to make a use solution. Although the top portion is shown for use with bottom portion 104, it is recognized that the top portion may be used with a variety of different types of dispensers and is not limited to use with bottom portion 104.

Figure 6:
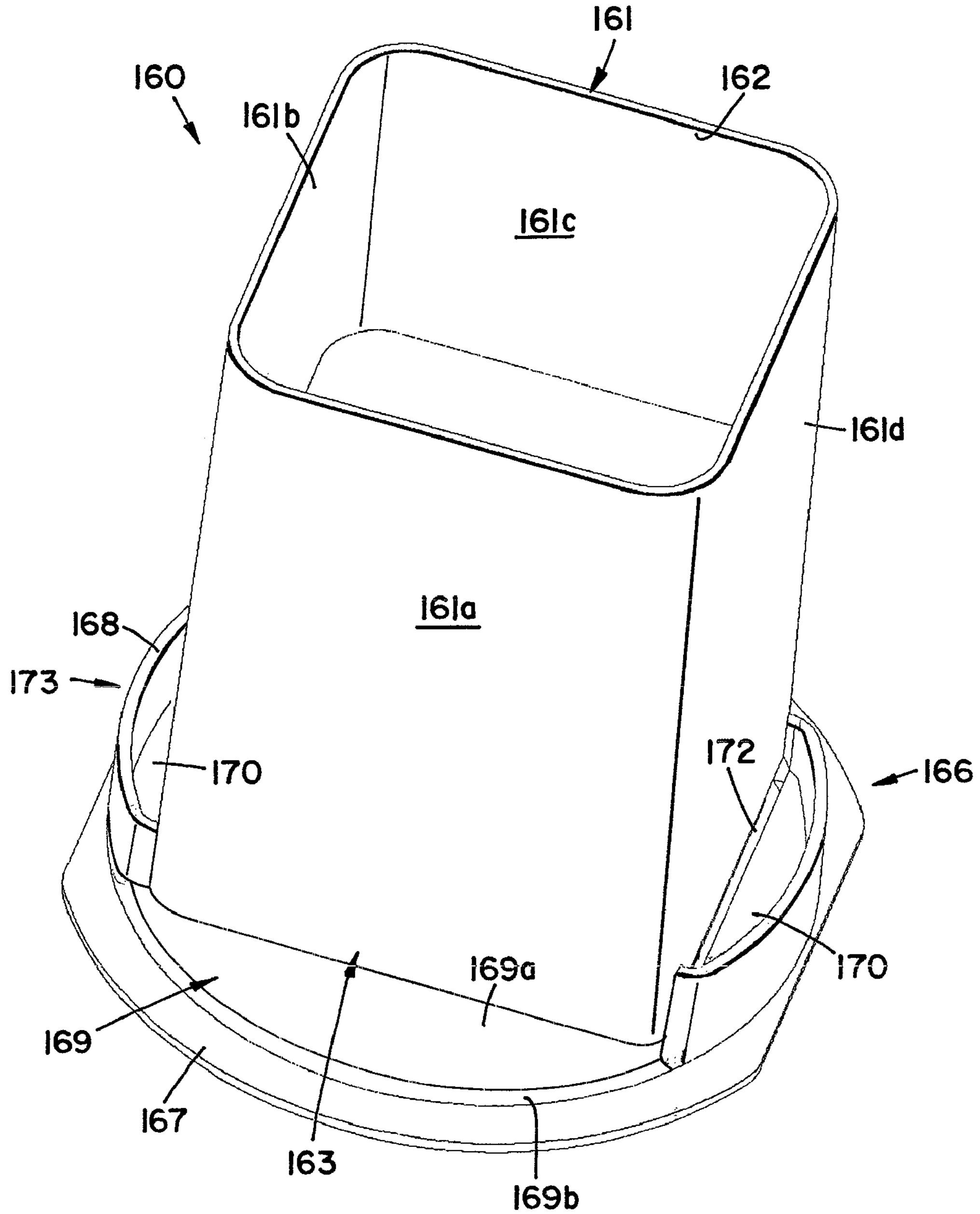
FIG. 6 is a top perspective view of a top portion for use with the dispenser shown in FIG. 1.
Figure 7:
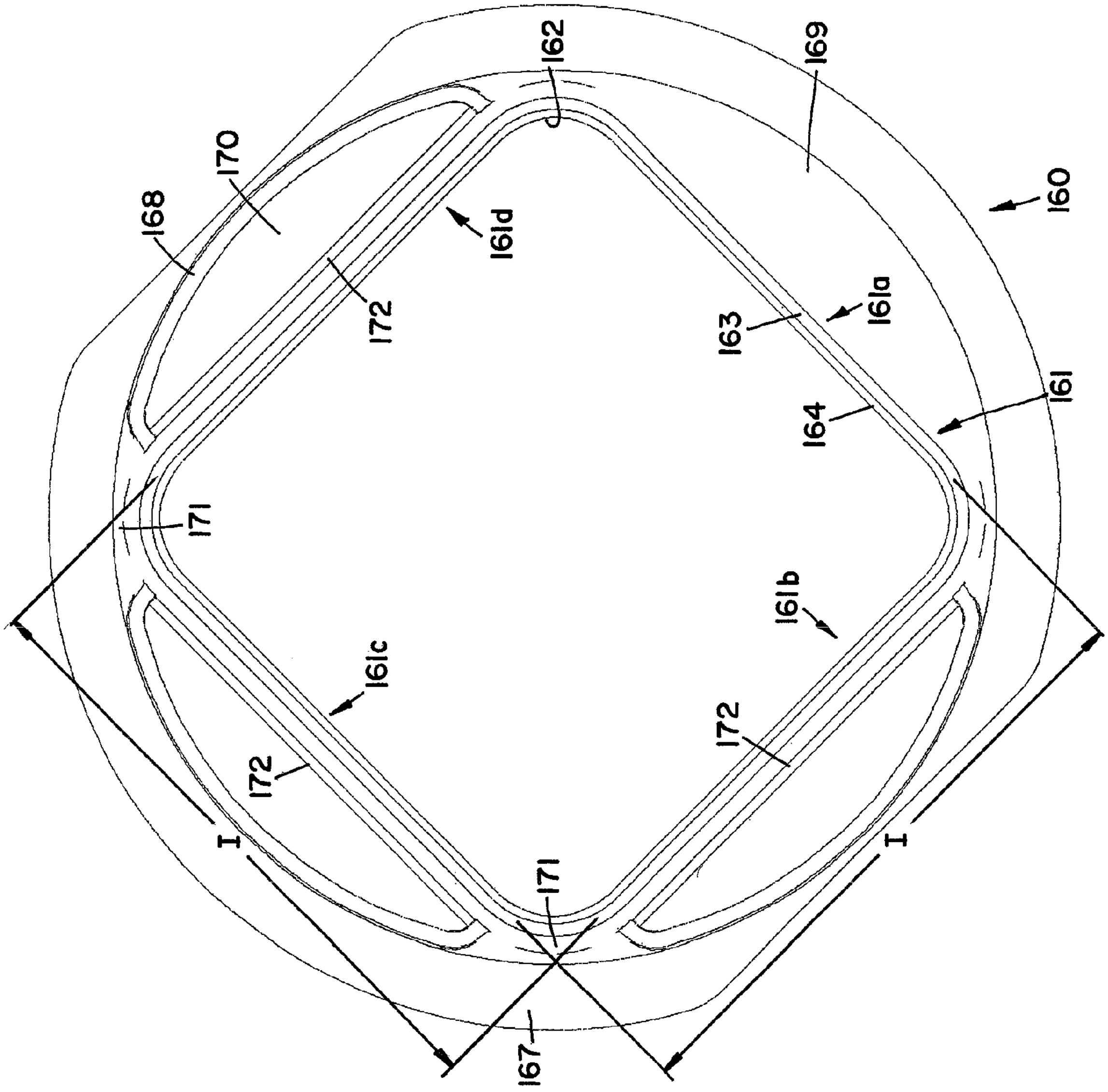
FIG. 7 is a top view of the top portion shown in FIG. 6.
Figure 8:
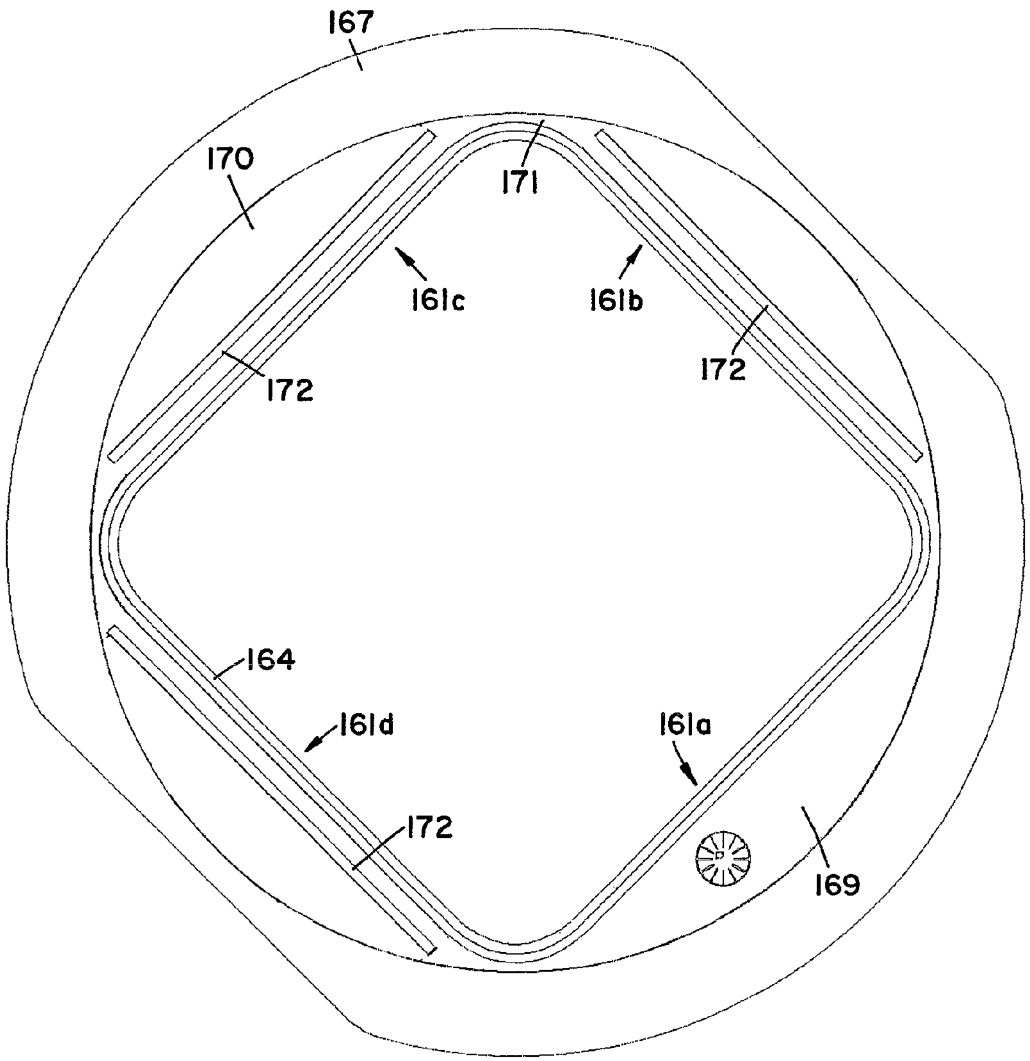
FIG. 8 is a bottom view of the top portion shown in FIG. 6.
Figure 15:
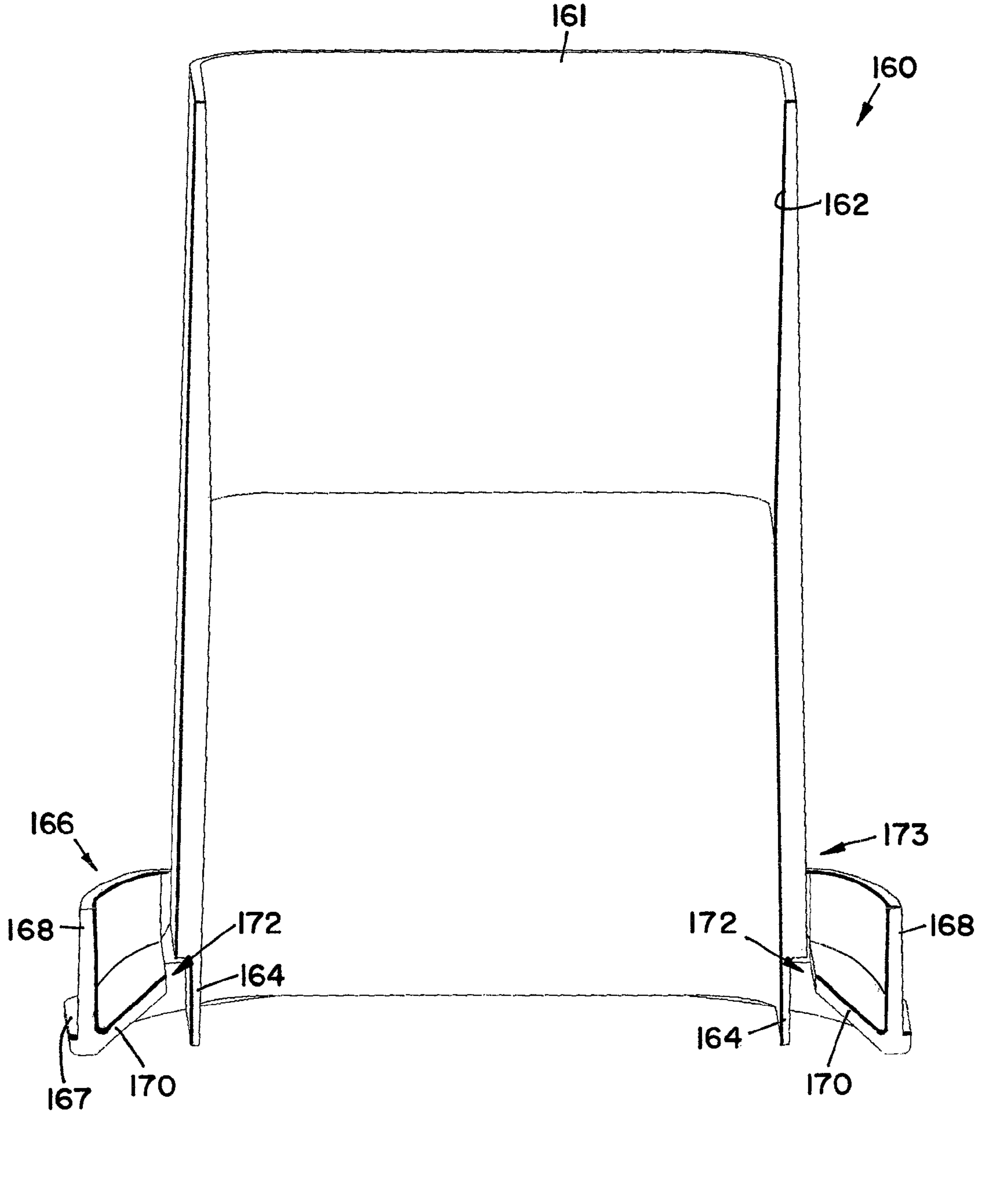
FIG. 15 is a cross-sectional view of the top portion shown in FIG. 6.
Figure 16:
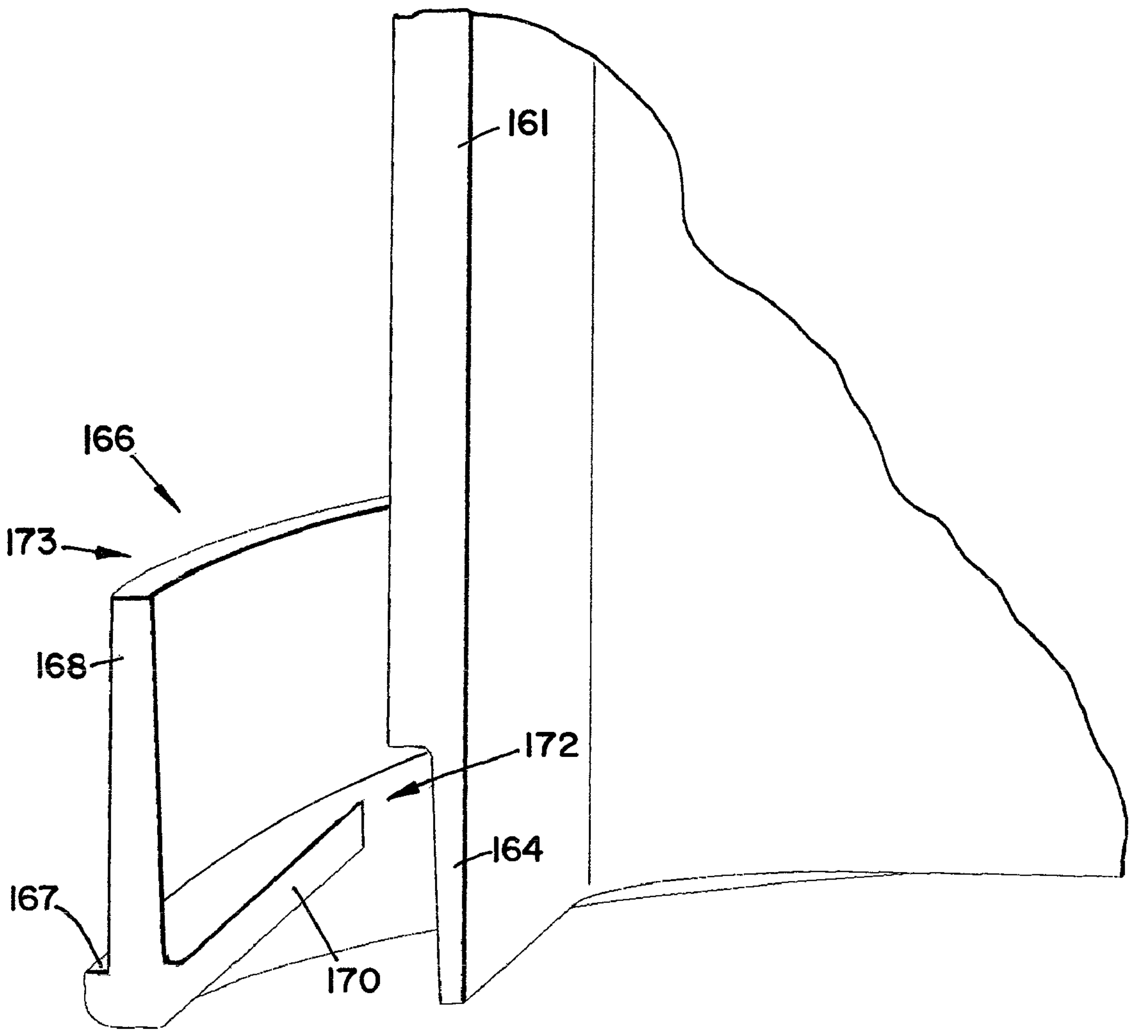
FIG. 16 is a partial cross-sectional view of the top portion shown in FIGS. 6 and 15 showing a base portion of the top portion.

As shown in FIGS. 6-8, the top portion 160 includes a square-shaped product holder 161 having a square-shaped cavity 162 and a base portion 166 preferably integral with the product holder 161 proximate the bottom of the product holder 161. A front portion 163 on a first side 161*a* of the square-shaped product holder 161 extends downward relative to the other sides and is operatively connected to a horizontal surface 169*a* of a step portion 169. A vertical surface 169*b* of the step portion 169 interconnects the horizontal surface 169*a* and a flange 167 which extends about the product holder 161. A railing 168 interconnects each of the remaining three sides 161*b*, 161*c*, and 161*d* (not including the first side 161*a* from which the front portion 163 extends) and the flange 167. Each of the railings 168 is operatively connected to the product holder 161 proximate the two corners of each side and bow outward proximate the middle of each side. Proximate the bottom of each of the railings 168 an angled portion 170 extends upward toward the product holder 161 at an angle of approximately 38 to 46°. The angled portions 170 do not extend all the way to the product holder 161 thereby creating overflow outlets 172. The overflow outlets are preferably slots having a width of 0.020 to 0.045 inch and a height of 0.100 to 0.130 inch. Connectors 171 interconnect the extension flange 164, the railings 168, and the flange 167 proximate the two corners between sides 161*b*, 161*c*, and 161*d*. An extension flange 164 extends downward from the bottom of the product holder 161 and does not extend all the way to the flange 167. Preferably, the extension flange 164 extends approximately 1.25 inches from the product holder 161. The height between the extension flange 164 and the flange 167 is approximately 0.04 to 0.08 inch. A flood plane 173 is proximate the top of the railing 168. FIGS. 15 and 16 show cross-sectional views of the base portion 166.

The product holder 161 is preferably approximately 5.75 inches tall, and the flood plane 173 may be located anywhere up to approximately 2.25 inches from the bottom of the product holder 161. This will ensure that the bottom 252 of the vacuum breaker 250 is at least 3.50 inches from the flood plane 173 as is typically required by code.

Figure 9:
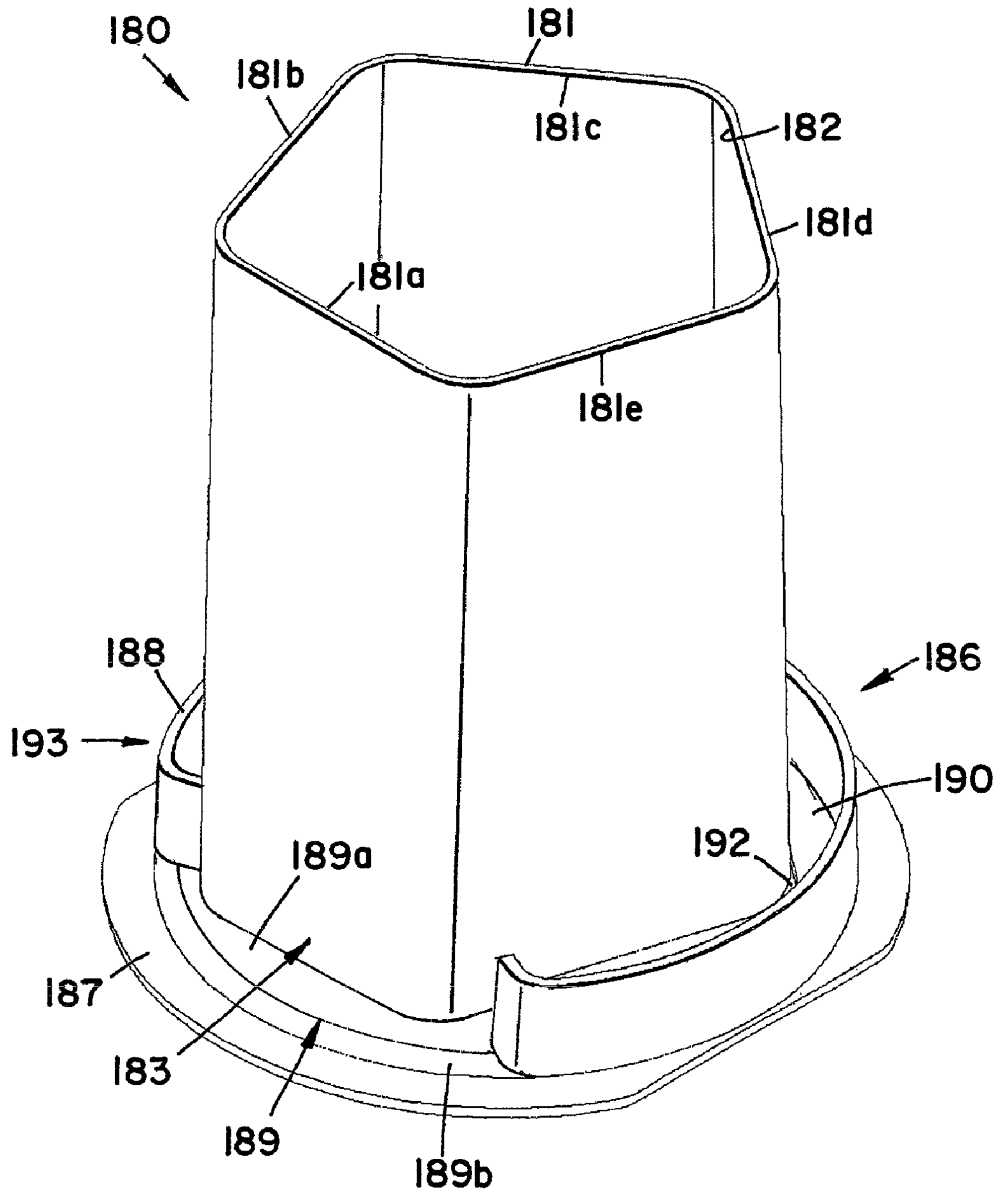
FIG. 9 is a top perspective view of another embodiment top portion for use with the dispenser shown in FIG. 1.
Figure 10:
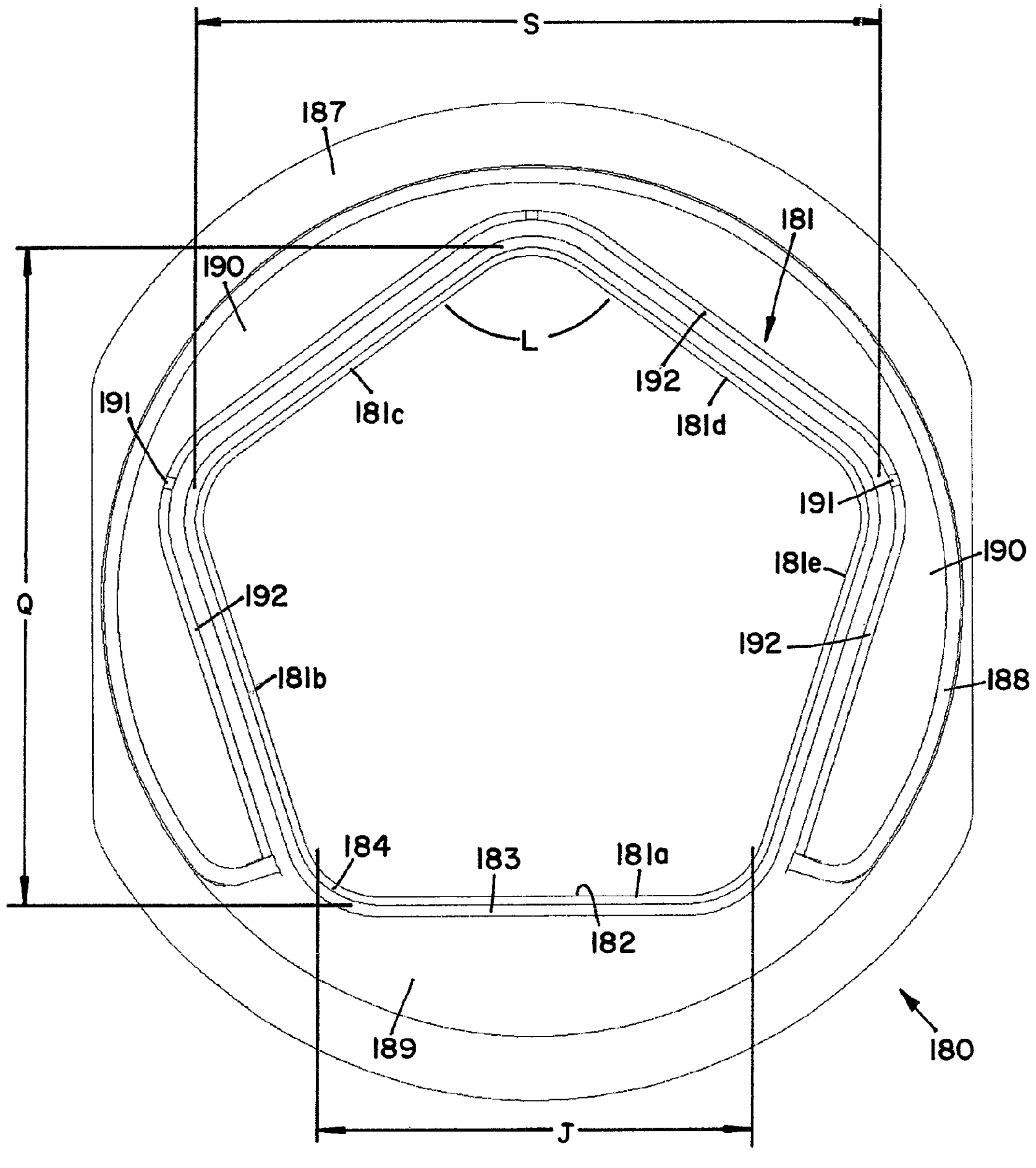
FIG. 10 is a top view of the top portion shown in FIG. 9.
Figure 11:
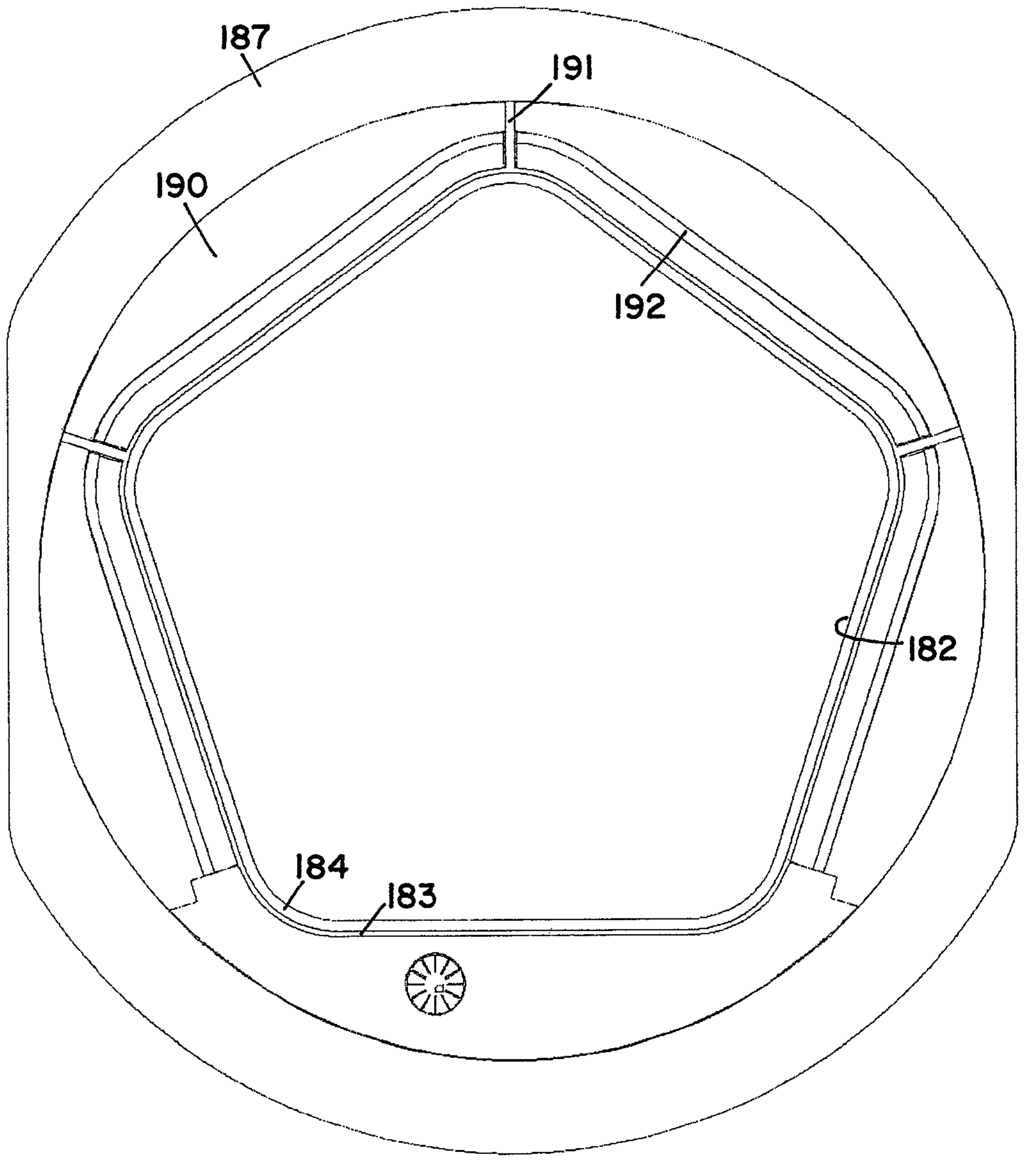
FIG. 11 is a bottom view of the top portion shown in FIG. 9.

As shown in FIGS. 9-11, top portion 180 includes a pentagon-shaped product holder 181 having a pentagon-shaped cavity 182 and a base portion 186 preferably integral with the product holder 181 proximate the bottom of the product holder 181. A front portion 183 on a first side 181*a* of the pentagon-shaped product holder 181 extends downward relative to the other sides and is operatively connected to a horizontal surface 189*a* of a step portion 189. A vertical surface 189*b* of the step portion 189 interconnects the horizontal surface 189*a* and a flange 187 which extends about the product holder 181. A railing 188 interconnects each of the remaining four sides 181*b*, 181*c*, 181*d*, and 181*e* (not including the first side 181*a* from which the front portion 183 extends) and the flange 187. Preferably, the railing 188 extends about the four sides 181*b*, 181*c*, 181*d*, and 181*e*. The railing 188 is operatively connected to the product holder 181 proximate the juncture of each of the four sides. Proximate the bottom of the railing 188 an angled portion 190 extends upward toward the product holder 181 at an angle of approximately 38 to 46° proximate each of the four sides 181*b*, 181*c*, 181*d*, and 181*e*. The angled portions 190 do not extend all the way to the product holder 181 thereby creating overflow outlets 192. The overflow outlets 192 are preferably slots having a width of 0.020 to 0.045 inch and a height of 0.100 to 0.130 inch. Connectors 191 interconnect the extension flange 184, the railing 188, and the flange 187 proximate the junctures of the sides 181*b*, 181*c*, 181*d*, and 181*e*. An extension flange 184 extends downward from the bottom of the product holder 181 and does not extend all the way to the flange 187. The extension flange 184 is similar to the extension flange 164. Preferably, the extension flange 184 extends approximately 1.25 inches from the product holder 181. The height between the extension flange 184 and the flange 187 is approximately 0.04 to 0.08 inch. A flood plane 193 is proximate the top of the railing 188.

The product holder 181 is preferably approximately 5.75 inches tall, and the flood plane 193 may be located anywhere up to approximately 2.25 inches from the bottom of the product holder 181. This will ensure that the vacuum breaker is at least 3.50 inches from the flood plane 193 as is typically required by code.

Figure 12:
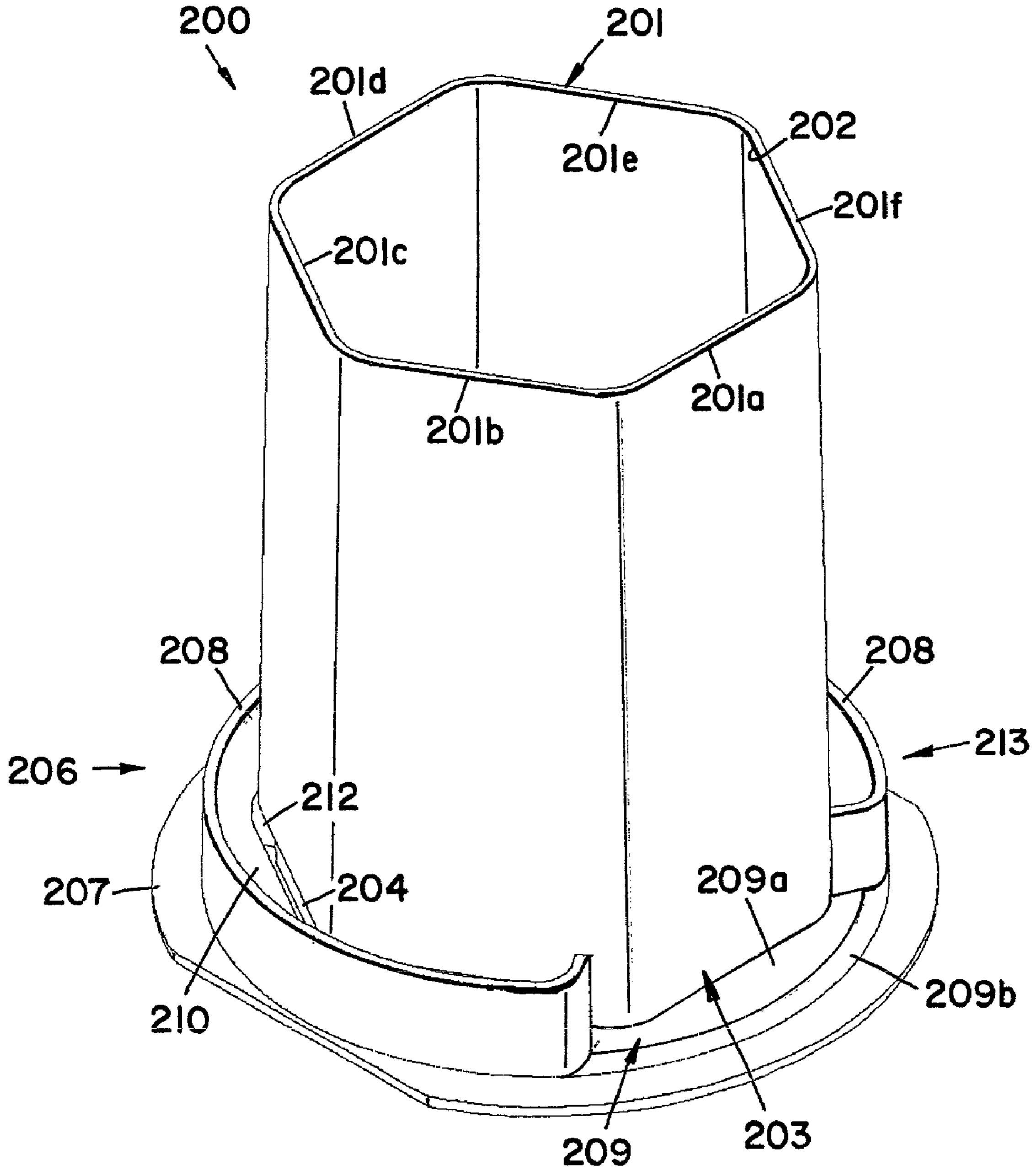
FIG. 12 is a top perspective view of another embodiment top portion for use with the dispenser shown in FIG. 1.
Figure 13:
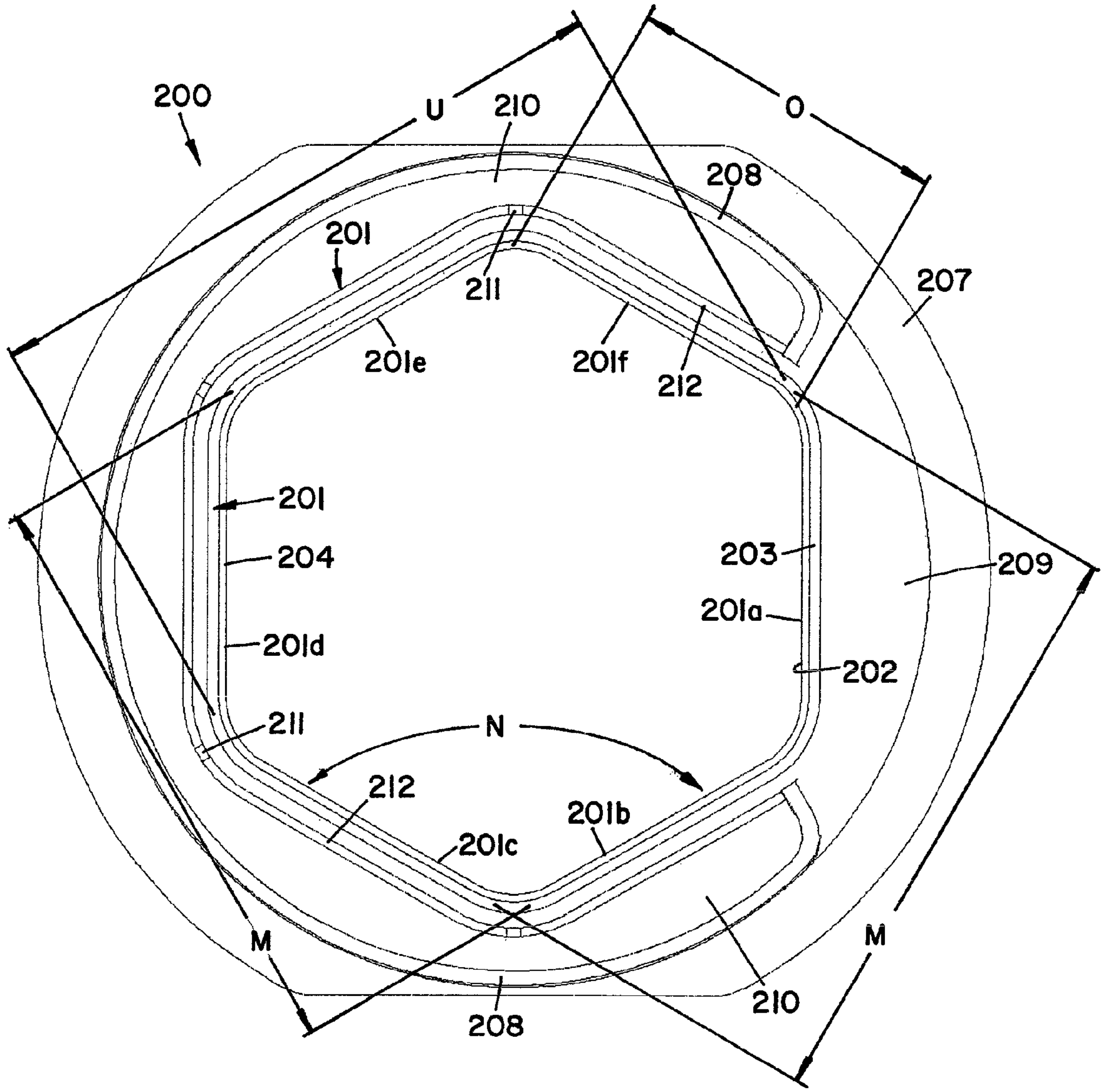
FIG. 13 is a top view of the top portion shown in FIG. 12.
Figure 14:
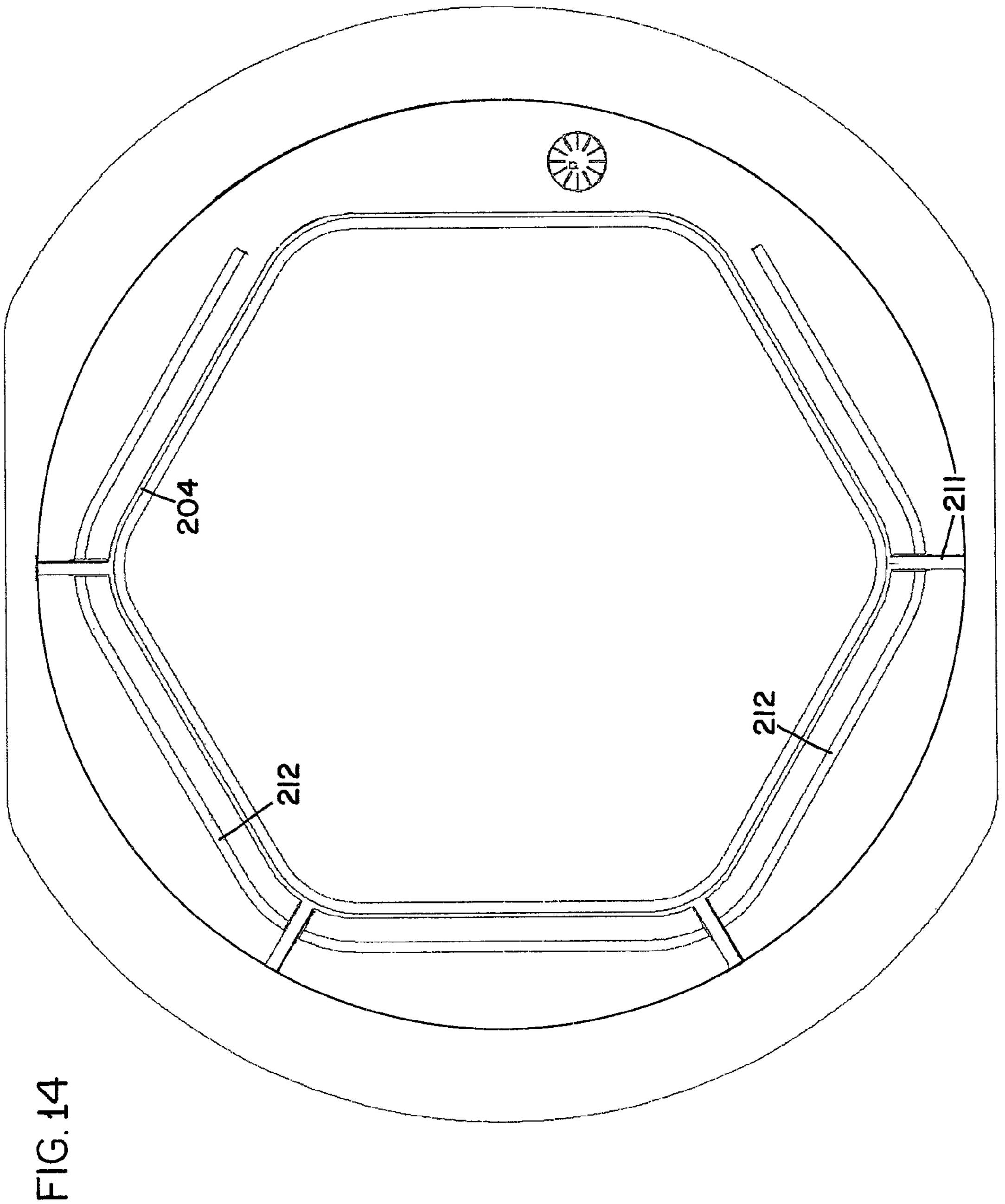
FIG. 14 is a bottom view of the top portion shown in FIG. 12.

As shown in FIGS. 12-14, top portion 200 includes a hexagon-shaped product holder 201 having a hexagon-shaped cavity 202 and a base portion 206 preferably integral with the product holder 201 proximate the bottom of the product holder 201. A front portion 203 on a first side 201*a* of the hexagon-shaped product holder 201 extends downward relative to the other sides and is operatively connected to a horizontal surface 209*a* of a step portion 209. A vertical surface 209*b* of the step portion 209 interconnects the horizontal surface 209*a* and a flange 207 which extends about the product holder 201. A railing 208 interconnects each of the remaining five sides 201*b*, 201*c*, 201*d*, 201*e*, and 201*f* (not including the first side 201*a* from which the front portion 203 extends) and the flange 207. Preferably, the railing 208 extends about the five sides 201*b*, 201*c*, 201*d*, 201*e*, and 201*f*. The railing 208 is operatively connected to the product holder 201 proximate the juncture of each of the five sides. Proximate the bottom of the railing 208 an angled portion 210 extends upward toward the product holder 201 at an angle of approximately 38 to 46° proximate each of the five sides 201*b*, 201*c*, 201*d*, 201*e*, and 201*f*. The angled portions 210 do not extend all the way to the product holder 201 thereby creating overflow outlets 212. The overflow outlets 212 are preferably slots having a width of 0.020 to 0.045 inch and a height of 0.100 to 0.130 inch. Connectors 211 interconnect the extension flange 204, the railing 208, and the flange 207 proximate the junctures of the sides 201*b*, 201*c*, 201*d*, 201*e*, and 201*f*. An extension flange 204 extends downward from the bottom of the product holder 201 and does not extend all the way to the flange 207. The extension flange 204 is similar to the extension flange 164. Preferably, the extension flange 204 extends approximately 1.25 inches from the product holder 201. The height between the extension flange 204 and the flange 207 is approximately 0.04 to 0.08 inch. A flood plane 213 is proximate the top of the railing 208.

The product holder 201 is preferably approximately 5.75 inches tall, and the flood plane 213 may be located anywhere up to approximately 2.25 inches from the bottom of the product holder 201. This will ensure that the vacuum breaker is at least 3.50 inches from the flood plane 213 as is typically required by code.

The different top portions may be used as solid product lock-outs to ensure the appropriate type of product is used with the dispenser. The solid product desired to be used with a dispenser has a corresponding shape that is slightly smaller in scale than the shape of the product holder of the dispenser so that the solid product fits within the product holder while other-shaped solid products will not fit within the product holder. This is because different solid products and different product holders have different numbers of sides that have different lengths and that form different angles. No matter how the different solid products are arranged to be placed within the different product holders, the different solid products are locked-out of the different product holders. The shapes of the product holders and the corresponding products as well as the types of products are listed for illustrative purposes only and are not intended to limit the shapes and the types of products that may be used with the dispenser.

Figure 17:
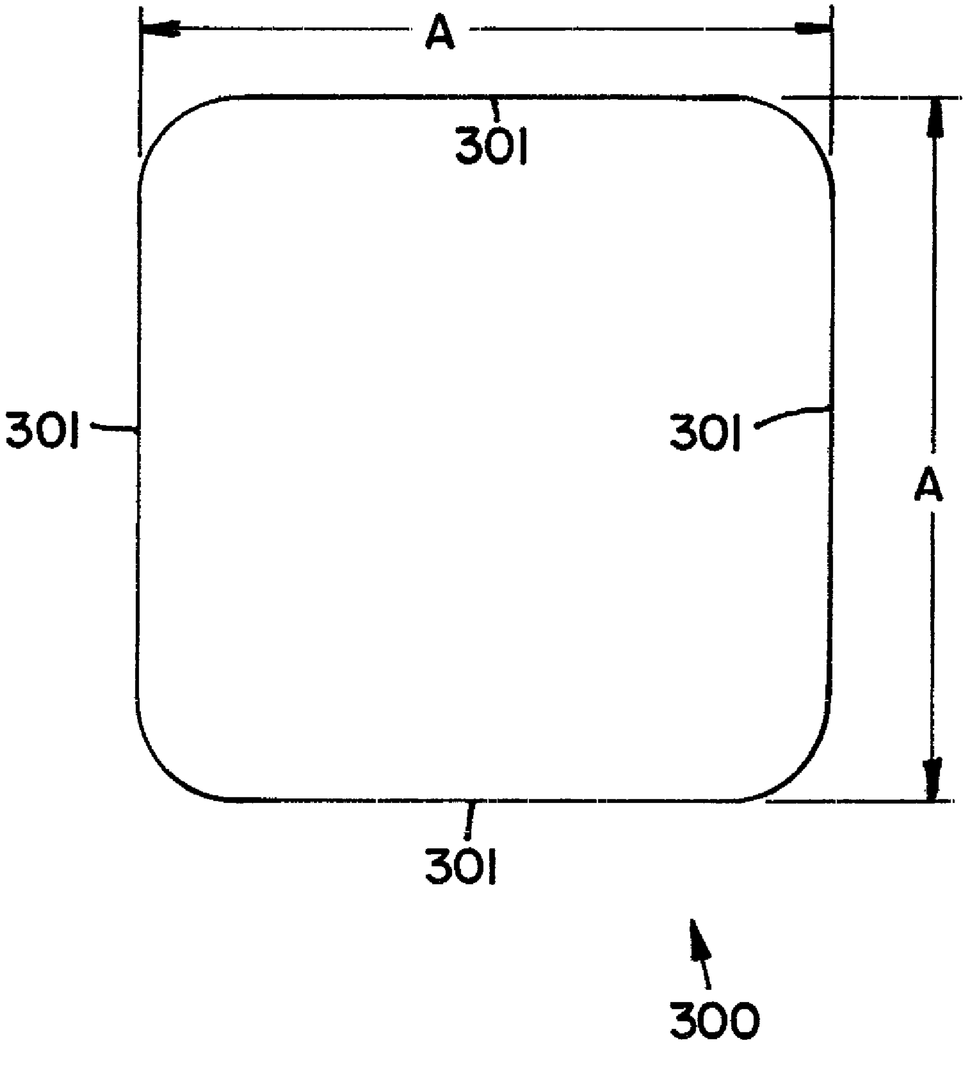
FIG. 17 is a top view of a solid product for use with the top portion shown in FIG. 6.

The top portion 160 includes a square-shaped product holder 161 with a cavity 162 configured and arranged to receive a square-shaped product 300, which is preferably a floor care product. As shown in FIG. 17, the product 300 includes sides 301, which each have a length A of approximately 3.550 inches. Adjacent sides 301 are preferably at an angle of approximately 90 degrees from one another. As shown in FIG. 7, the sides 161*a*, 161*b*, 161*c*, and 161*d* of the product holder 161 preferably each have a length I of approximately 4.005 inches. Adjacent sides are preferably at an angle of approximately 90 degrees from one another. The product holder 161 and the product 300 have corresponding shapes, but the product holder 161 (4.005 by 4.005 inches) is a slightly larger scale than the product 300 (3.550 by 3.550 inches) to receive the product 300 in the cavity 162. The product 300 has a shape that is a slightly smaller scale than the corresponding shape of the product holder 161 but not so much smaller as to nullify the lock-out feature.

Figure 18:
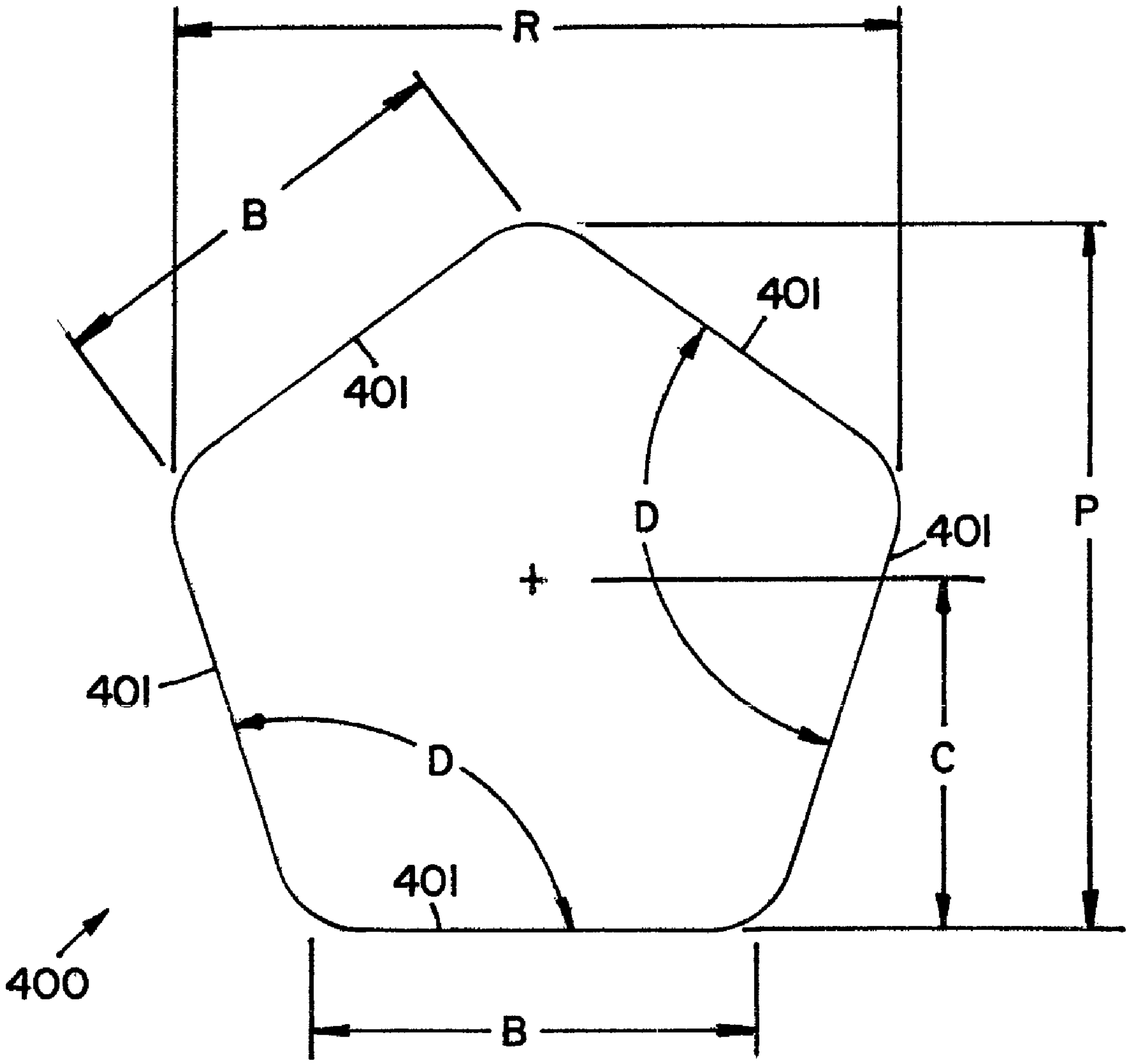
FIG. 18 is a top view of another embodiment solid product for use with the top portion shown in FIG. 9.

The top portion 180 includes a pentagon-shaped product holder 181 with a cavity 182 configured and arranged to receive a pentagon-shaped product 400, which is preferably an all purpose cleaner. As shown in FIG. 18, the product 400 includes sides 401, which each have a length B of approximately 2.701 inches. Dimension C is approximately 1.859 inches and is the dimension from proximate the center to a side 401 of the product 400. Dimension P is approximately 4.039 inches and is the dimension from proximate the juncture of two sides 401 and an opposing side 401. Perpendicular to dimension P is dimension R, which is approximately 4.146 inches and is the dimension from proximate the juncture of two sides 401 to the juncture of two opposing sides 401. Adjacent sides are preferably at an angle D of approximately 108 degrees from one another. As shown in FIG. 10, the sides 181*a*, 181*b*, 181*c*, 181*d*, and 181*e* of the product holder 181 preferably each have a length J of approximately 2.985 inches. Dimension Q is approximately 4.130 inches and is the dimension from proximate the juncture of sides 181*c* and 181*d* and the opposing side 181*a*. Perpendicular to dimension Q is dimension S, which is approximately 4.242 inches and is the dimension from proximate the juncture of two sides 181*b* and 181*c* to the juncture of two opposing sides 181*d* and 181*e*. Adjacent sides are preferably at an angle L of approximately 108 degrees from one another. The product holder 181 and the product 400 have corresponding shapes, but the product holder 181 (Dimension Q (4.130 inches) by Dimension S (4.242 inches)) is a slightly larger scale than the product 400 (Dimension P (4.039 inches) by Dimension R (4.146 inches)) to receive the product 400 in the cavity 182. The product 400 has a shape that is a slightly smaller scale than the corresponding shape of the product holder 181 but not so much smaller as to nullify the lock-out feature.

Figure 19:
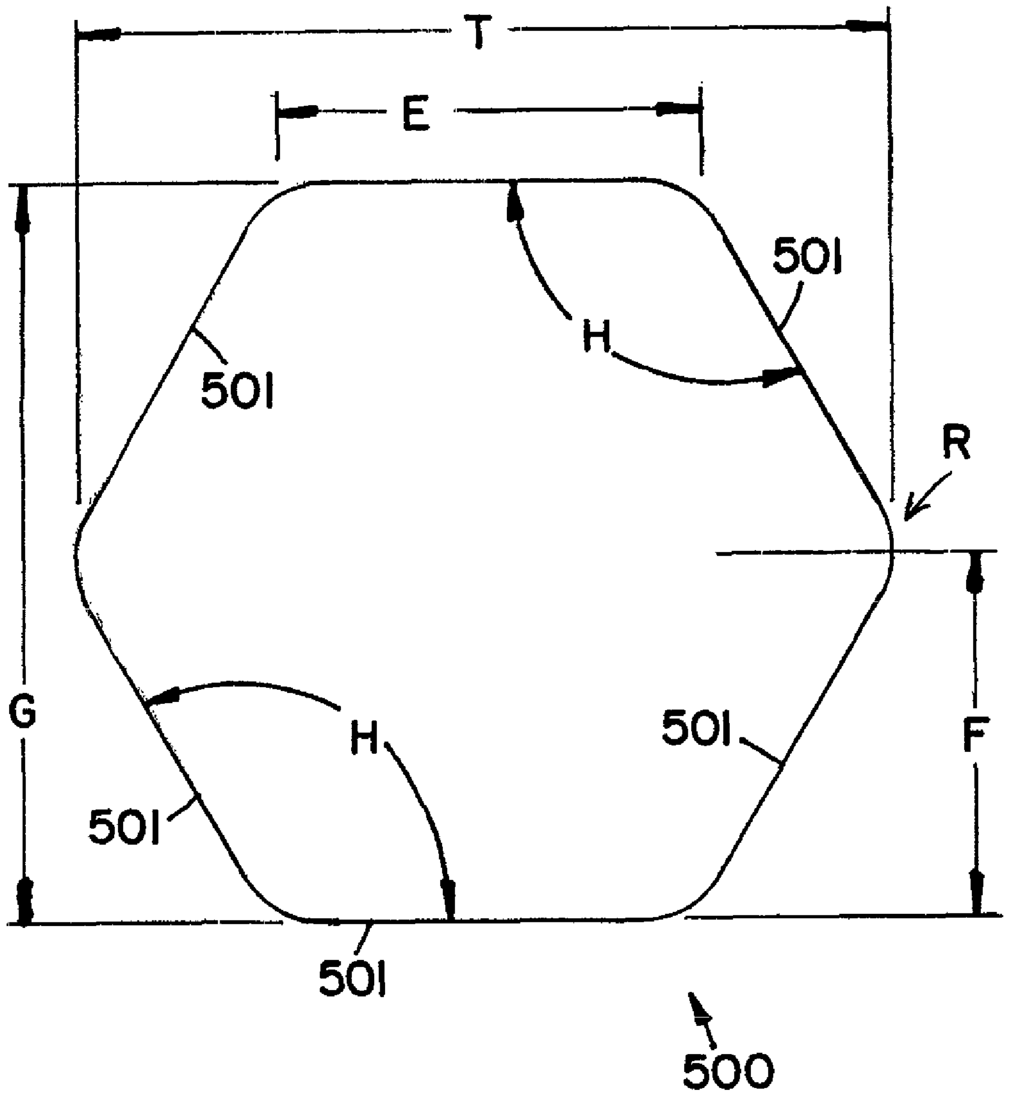
FIG. 19 is a top view of another embodiment solid product for use with the top portion shown in FIG. 12.

The top portion 200 includes a hexagon-shaped product holder 201 with a cavity 202 configured and arranged to receive a hexagon-shaped product 500, which is preferably a sanitizer. As shown in FIG. 19, the product 500 includes sides 501, which each have a length E of approximately 2.200 inches. Dimension F is approximately 1.905 inches and is the dimension of approximately half the width of the product 500, and dimension G is approximately 3.811 inches and is the width of the product 500. Dimension T is approximately 4.250 inches and is the dimension proximate the juncture of two sides 501 to the juncture of two opposing sides 501. Adjacent sides are preferably at an angle H of approximately 120 degrees from one another. As shown in FIG. 13, the sides 201*a*, 201*b*, 201*c*, 201*d*, 201*e*, and 201*f* of the product holder 201 preferably each have a length O of approximately 2.174 inches. Dimension M is approximately 3.900 inches and is the width of the product holder 201. Adjacent sides are preferably at an angle N of approximately 120 degrees from one another. Perpendicular to dimension M is dimension U, which is approximately 4.349 inches. The product holder 201 and the product 500 have corresponding shapes, but the product holder 201 (Dimension M (3.900 inches) by Dimension U (4.349 inches)) is a slightly larger scale than the product 500 (Dimension G (3.811 inches) by Dimension T (4.250 inches)) to receive the product 500 in the cavity 202. The product 500 has a shape that is a slightly smaller scale than the corresponding shape of the product holder 201 but not so much smaller as to nullify the lock-out feature.

The cavity 162 of the product holder 161 is configured and arranged to receive the product 300 therein, but products 400 and 500 will not fit within the cavity 162. More specifically, the lengths of the sides 401 and the angles D proximate the junctures of the sides 401 of the product 400 do not correspond with the lengths of the sides 161*a*, 161*b*, 161*c*, and 161*d* and the 90 degree angles proximate the junctures of the sides 161*a*, 161*b*, 161*c*, and 161*d* of the product holder 161. Further, the product 400 has dimensions of (Dimension P (4.039 inches) by Dimension R (4.146 inches)) and the product holder 161 has dimensions of Dimension I (4.005 inches) by Dimension I (4.005 inches) so the product 400 will not fit within the cavity 162 because the sides 401 protrude outward the dimension R, which is too large to fit within the cavity 162. The lengths of the sides 501 and the angles H proximate the junctures of the sides 501 of the product 500 do not correspond with the lengths of the sides 161*a*, 161*b*, 161*c*, and 161*d* and the 90 degree angles proximate the junctures of the sides 161*a*, 161*b*, 161*c*, and 161*d* of the product holder 161. Further, the product 500 has dimensions of Dimension G (3.811 inches) by Dimension T (4.250 inches) and the product holder 161 has dimensions of Dimension I (4.005 inches) by Dimension I (4.005 inches) inches so the product 500 will not fit within the cavity 162 because the sides 501 protrude outward the dimension T, which is too large to fit within the cavity 162.

Similarly, the cavity 182 of the product holder 181 is configured and arranged to receive the product 400 therein, but products 300 and 500 will not fit within the cavity 182. More specifically, the lengths of the sides 301 and the 90 degree angles proximate the junctures of the sides 301 do not correspond with the lengths of the sides 181*a*, 181*b*, 181*c*, 181*d*, and 181*e* and the angles L proximate the junctures of the sides 181*a*, 181*b*, 181*c*, 181*d*, and 181*e*. Further, although the product 300 has dimensions of Dimension A (3.550 inches) by Dimension A (3.550 inches) and the product holder 181 has dimensions of Dimension Q (4.130 inches) by Dimension S (4.242 inches), the length of the sides 181*a*, 181*b*, 181*c*, 181*d*, and 181*e* (Dimension J (2.985 inches)) is smaller than the length of the sides 301 (Dimension A (3.550 inches)) so one of the sides 301 of the product 300 must be moved more proximate Dimension S within the cavity 182 but then a portion of the product 300 opposite the one side 301 will not fit within the cavity 182. For example, if a side 301 were positioned within the cavity 182 parallel to side 181*a* more proximate Dimension S within the cavity 182, sides 182*c* and 182*d* would cut off the corners of the side 301 opposite the one side 301 that fit within the cavity 182. The lengths of the sides 501 and the angles H proximate the junctures of the sides 501 of the product 500 do not correspond with the lengths of the sides 181*a*, 181*b*, 181*c*, 181*d*, and 181*e* and the angles L proximate the junctures of the sides 181*a*, 181*b*, 181*c*, 181*d*, and 181*e*. Further, the product 500 has dimensions of Dimension G (3.811 inches) by Dimension T (4.250 inches) and the product holder 181 has dimensions of Dimension Q (4.130 inches) by Dimension S (4.242 inches) so the product 500 will not fit within the cavity 182 because Dimension T is larger than either Dimension Q or Dimension S.

Similarly, the cavity 202 of the product holder 201 is configured and arranged to receive the product 500 therein, but products 300 and 400 will not fit within the cavity 202. More specifically, the lengths of the sides 301 and the 90 degree angles proximate the junctures of the sides 301 do not correspond with the lengths of the sides 201*a*, 201*b*, 201*c*, 201*d*, 201*e*, and 201*f* and the angles N proximate the junctures of the sides 201*a*, 201*b*, 201*c*, 201*d*, 201*e*, and 201*f*. Further, although the product 300 has dimensions of Dimension A (3.550 inches) by Dimension A (3.550 inches) and the product holder 201 has dimensions of Dimension M (3.900 inches) by Dimension U (4.349 inches), the length of the sides 201*a*, 201*b*, 201*c*, 201*d*, 201*e*, and 201*f* (Dimension 0 (2.174 inches) is smaller than the length of the sides 301 (Dimension A (3.550 inches)) so one of the sides 301 of the product 300 must be moved more proximate either Dimension M or Dimension U within the cavity 202 but then a portion of the product 300 opposite the one side 301 will not fit within the cavity 202. For example, if a side 301 were positioned within the cavity 202 parallel to side 201*b* more proximate Dimension U within the cavity 202, sides 201*d* and 201*f* would cut off the corners of the side 301 opposite the one side 301 that fit within the cavity 202. Similarly, if a side 301 were positioned within the cavity 202 perpendicular to side 201*b* within Dimension M within the cavity 202, sides 201*c* and 201*d* would cut off the corners of the side 301 opposite the one side 301 that fit within the cavity 202. The lengths of the sides 401 and the angles D proximate the junctures of the sides 401 do not correspond with the lengths of the sides 201*a*, 201*b*, 201*c*, 201*d*, 201*e*, and 201*f* and the angles N proximate the junctures of the sides 201*a*, 201*b*, 201*c*, 201*d*, 201*e*, and 201*f*. Further, although the product 400 has dimensions of Dimension P (4.039 inches) by Dimension R (4.146 inches) and the product holder 201 has dimensions of Dimension M (3.900 inches) by Dimension U (4.349 inches), the length of the sides 201*a*, 201*b*, 201*c*, 201*d*, 201*e*, and 201*f* (Dimension 0 (2.174 inches) is smaller than the length of the sides 401 (Dimension B (2.701 inches)) so one of the sides 401 of the product 400 must be moved more proximate Dimension U within the cavity 202 but then a portion of the product 400 opposite the one side 401 will not fit within the cavity 202. For example, if a side 401 were positioned within the cavity 202 parallel to side 201*b* more proximate Dimension U within the cavity 202, sides 201*d* and 201*f* would cut off the corners of the two sides 401 opposite the one side 401 that fit within the cavity 202.

Because the products 400 and 500 will not fit within the cavity 162, the products 300 and 500 will not fit within the cavity 182, and the products 300 and 400 will not fit within the cavity 202, the product holders act as solid product lock-outs to ensure the appropriate types of products are used with the appropriate dispensers. Thus, if several dispensers are used in proximity to one another, the solid product lock-outs ensure the appropriate product is used in each dispenser.

In operation, a diluent, preferably water, is supplied via conduits well known in the art to the first inlet 114, the second inlet 116, and the optional third inlet 117. If the third inlet 117 and the third passageway 117*b* are included, the third passageway 117*b* may be closed off or sealed proximate the second cavity 113 if it is not desired to use the third inlet 117. The diluent flows through the first passageway 114*b*, the second passageway 116*b*, and the third passageway 117*b*.

As shown in FIG. 4, from the first passageway 114*b*, the diluent continues to flow through the manifold 112 and into the spray nozzle 115 where it is sprayed upward within the cavity 105, through the screen 144, and onto the solid product (not shown) to create a concentrated solution. The concentrated solution flows downward through the cavity 105, through the first cavity 111, through the conical portion 129 and the outlet portion 130 of the cavity 128, and out of the dispenser 100 through the bottom of the outlet portion 123.

As shown in FIG. 3, from the second passageway 116*b*, the diluent continues to flow through the manifold 112 and into the second cavity 113 where it hits the baffle 118, which caused the diluent to flow downward through the second cavity 113, into the cavity 142, and out of the dispenser 100 through the bottom of the diluent outlet 136. The concentrated solution and the diluent mix in the outlet tube 148 to form a use solution, which is directed to the desired location via the outlet tube 148.

If the third inlet 117 and the third passageway 117*b* are used, a temperature control valve (not shown) such as that disclosed in U.S. Patent Application Publication Nos. US 2006/0083668 A1 and US 2006/0083669 A1 may be used to monitor the temperature of the diluent. If the temperature of the diluent reaches approximately 105 to 120° F., more product will be dissolved by the diluent thereby increasing the concentration of the concentrated solution and the thermal valve will turn on to allow diluent to flow through the third inlet 117, which will assist in adjusting the concentration of the diluent. If the temperature of the diluent is below approximately 105 to 120° F., the thermal valve will be turned off to prevent diluent from flowing through the third inlet 117. The third inlet 117 is preferably used with products such as sanitizers or other types of products for which it is desired to control the diluent temperature. For solid products that do not require the regulation of diluent temperature, the third inlet 117 is preferably not used and the passageway 117*b* is closed off.

When the third inlet 117 is used, water is preferably supplied to the dispenser 100 at a rate of up to 9.0 gpm, of which up to 1.0 gpm is supplied to the first inlet and sprayed onto the solid product, up to 4.0 gpm is supplied to the second inlet, and up to 4.0 gpm is supplied to the third inlet when the thermal valve is on. When the third inlet 117 is not used and the third passageway 117*b* is sealed, water is preferably supplied to the dispenser 100 at a rate of up to 5.0 gpm, of which up to 1.0 gpm is supplied to the first inlet and sprayed onto the solid product and up to 4.0 gpm is supplied to the second inlet.

The concentrated solution and the diluent flow out of the dispenser 100 substantially concurrently. The flow rate of the diluent as it exits through the cavity 142 is up to 8.0 gpm. The flow rate of the concentrated solution as it exits through the cavity 130 is up to 1.0 gpm. The flow rate of the use solution as it exits through the cavity outlet tube 148 is up to 9.0 gpm. The relatively small inner diameter of the diluent outlet 136 creates a relatively fast flow rate, which creates a venturi to draw the concentrated solution out of the cavity 130. The smaller the inner diameter of the diluent outlet 136, the faster and more turbulent the diluent will exit the diluent outlet 136 thus increasing the venturi effect. The increased velocity of the diluent creates a negative pressure, which extracts the concentrated solution from the cavity 130 (and the cavities 129 and 111), and the diluent and the concentrated solution are mixed within the outlet tube 148. The inner diameter of the outlet tube 148 is preferably as small as possible and sized to allow the concentrated solution and the diluent (up to 9.0 gpm) which mix together to create a use solution as they exit the dispenser 100 freely without backing up.

The venturi is beneficial for at least two reasons. First, the concentrated solution and the diluent exit the dispenser 100 more quickly thereby reducing the time to dispense the use solution. Second, if a solid portion of a solid product breaks off and falls into the cavity of the dispenser, the increased rate at which the concentrated solution exits the cavity erodes the solid portion of the solid product more quickly.

The bottom 252 of the vacuum breaker 250 is typically required by code to be at least 3.50 inches from the flood plane 173 for backflow prevention. The flood plane 173 has been lowered to proximate the bottom of the product holder 161, and this allows the vacuum breaker to be closer to the top of the top portion 160 thus reducing the space needed for the dispenser 100. Spraying the solid product with diluent proximate the bottom of the product holder 161 and the flood plane 173 poses a challenge to keeping the diluent from spraying out of the overflow outlets 172. The overflow outlets 172 should be large enough to allow up to 9.0 gpm of diluent and concentrated solution to escape when the dispenser 100 is backed-up but help prevent diluent and concentrated solution from splashing out of the top portion 160 while the diluent is being sprayed onto the bottom surface of the solid product to create the concentrated solution. However, this challenge has been overcome by the geometry of the base portion 166 and the extension flange 164.

The extension flange 164 of the product holder 161 helps prevent diluent from splashing through the overflow outlets 172 while allowing any back-up to escape through the gap between the extension flange 164 and the flange 167. Further, the angled portion 170 helps prevent any diluent that may have gotten past the extension flange 164 from splashing through the overflow outlets 172 because the diluent will hit the angled portion 170 more proximate the flange 167 than the overflow outlets 172 and then stay within the dispenser 100. The diluent will hit the angled portion 170 more proximate the flange 167 because the extension flange 164 extends downward to block diluent from hitting the angled portion 170 more proximate the overflow outlets 172.

It is understand that one or more dispensers may be used. An example is a single dispenser may be used to dispense a cleaning agent into a mop bucket. Another example is a first dispenser may be used to dispense a detergent, a second dispenser may be used to dispense a sanitizer, and a third dispenser may be used to dispense a rinse aid into a warewashing machine.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A product housing for use with a solid product, a solid product dispenser having a nozzle, and a vacuum breaker, the solid product having a bottom surface, comprising:

a product holder having a bottom, the product holder being configured and arranged to receive the solid product with the bottom surface proximate the bottom, the bottom being positioned proximate above the solid product dispenser and the nozzle and proximate below the vacuum breaker;

a railing operatively connected to the product holder proximate the bottom and extending about a portion of the product holder proximate the bottom at a distance from the product holder;

an angled portion operatively connected to the railing and extending upward and inward toward the product holder at an angle;

an overflow outlet proximate the bottom and proximate above the solid product dispenser and the nozzle and proximate below the vacuum breaker, the overflow outlet being a gap formed by at least the angled portion and the product holder; and a flood plane proximate the overflow outlet and proximate above the solid product dispenser and the nozzle and proximate below the vacuum breaker.

2. The product housing of claim 1, wherein the vacuum breaker is at least approximately 3.50 inches above the flood plane.

3. The product housing of claim 1, further comprising:

an extension flange extending downward from proximate the bottom of the product holder;

a base portion operatively connected to the bottom of the product holder, the base portion including a support flange, the railing, and the angled portion, the support flange configured and arranged to be supported by a top portion of the solid product dispenser, the railing extending upward from proximate the support flange, and the angled portion extending upward proximate the support flange and the railing toward the product holder at an angle and creating the overflow outlet proximate the bottom of the product holder; and the extension flange and the angled portion configured and arranged to assist in preventing diluent sprayed onto the bottom surface of the solid product by the solid product dispenser from exiting the overflow outlet.

4. The product housing of claim 3, wherein the angle is approximately 38 to 46°.

5. The product housing of claim 3, wherein the overflow outlet is a slot having a width of approximately 0.020 to 0.045 inch and a height of approximately 0.100 to 0.130 inch.

6. The product housing of claim 3, further comprising a connector interconnecting the extension flange, the railing, and the support flange.

7. The product housing of claim 3, wherein the flood plane is proximate a top of the railing.

8. The product housing of claim 3, the solid product having a first shape and the product holder having a cavity with a second shape corresponding with the first shape of the solid product, the first shape being a smaller scale than the second shape, the cavity being configured and arranged to receive the solid product, the first and second shapes creating a lock-out to assist in preventing another solid product from being placed within the cavity.

9. The product housing of claim 8, wherein the first shape and the second shape are squares.

10. The product housing of claim 9, wherein the solid product is a floor care product.

11. The product housing of claim 8, wherein the first shape and the second shape are pentagons.

12. The product housing of claim 11, wherein the solid product is an all purpose cleaner.

13. The product housing of claim 8, wherein the first shape and the second shape are hexagons.

14. The product housing of claim 13, wherein the solid product is a sanitizer.

15. A product housing for use with a solid product, a solid product dispenser, and a vacuum breaker, the solid product having a bottom surface, comprising:

a product holder having a bottom, the product holder being configured and arranged to receive the solid product with the bottom surface proximate the bottom, the bottom being positioned proximate above the solid product dispenser and proximate below the vacuum breaker;

an extension flange extending downward from proximate the bottom of the product holder;

a base portion operatively connected to the bottom of the product holder, the base portion including a support flange, a railing, and an angled portion, the support flange configured and arranged to be supported by a top portion of the solid product dispenser, the railing extending upward from proximate the support flange, and the angled portion extending upward proximate the support flange and the railing toward the product holder at an angle of approximately 38 to 46° and creating an overflow outlet proximate the bottom of the product holder, the overflow outlet being a slot having a width of approximately 0.020 to 0.045 inch and a height of approximately 0.100 to 0.130 inch;

a flood plane proximate the overflow outlet, the vacuum breaker being at least approximately 3.50 inches above the flood plane; and the extension flange and the angled portion configured and arranged to assist in preventing diluent sprayed onto the bottom surface of the solid product by the solid product dispenser from exiting the overflow outlet.

16. The product housing of claim 15, the solid product having a first shape and the product holder having a cavity with a second shape corresponding with the first shape of the solid product, the first shape being a smaller scale than the second shape, the cavity being configured and arranged to receive the solid product, the first and second shapes creating a lock-out to assist in preventing another solid product from being placed within the cavity.

17. A solid product dispensing assembly, comprising:

a vacuum breaker;

a solid product dispenser having a nozzle;

a solid product having a bottom surface; and a product holder having a bottom, a railing operatively connected to the product holder proximate the bottom and extending about a portion of the product holder proximate the bottom at a distance from the product holder, an angled portion operatively connected to the railing and extending upward and inward toward the product holder at an angle, an overflow outlet proximate the bottom, the overflow outlet being a gap formed by at least the angled portion and the product holder, and a flood plane proximate the overflow outlet, the product holder being configured and arranged to receive the solid product with the bottom surface proximate the bottom, the bottom the overflow outlet, and the flood plane being positioned proximate above the solid product dispenser and the nozzle and proximate below the vacuum breaker, the vacuum breaker being at least approximately 3.50 inches above the flood plane.

18. The solid product dispensing assembly of claim 17, wherein the solid product has a first shape and the product holder having a cavity with a second shape corresponding with the first shape of the solid product, the first shape being a smaller scale than the second shape, the cavity being configured and arranged to receive the solid product, the first and second shapes creating a lock-out to assist in preventing another solid product from being placed within the cavity.

19. The solid product dispensing assembly of claim 17, further comprising:

an extension flange extending downward from proximate the bottom of the product holder;

a base portion operatively connected to the bottom of the product holder, the base portion including a support flange, the railing, and the angled portion, the support flange configured and arranged to be supported by a top portion of the solid product dispenser, the railing extending upward from proximate the support flange, and the angled portion extending upward proximate the support flange and the railing toward the product holder at an angle and creating the overflow outlet proximate the bottom of the product holder; and the extension flange and the angled portion configured and arranged to assist in preventing diluent sprayed onto the bottom surface of the solid product by the solid product dispenser from exiting the overflow outlet.

20. The solid product dispensing assembly of claim 19, wherein the angle at which the angled portion extends upward is approximately 38 to 46° and the overflow outlet is a slot having a width of approximately 0.020 to 0.045 inch and a height of approximately 0.100 to 0.130 inch.

* * * * *

UNITED STATES PATENT AND TRADEMARK OFFICE

CERTIFICATE OF CORRECTION

PATENT NO. : 8,313,707 B2
APPLICATION NO. : 13/104332
DATED : November 20, 2012
INVENTOR(S) : Scott R. Limback et al.

It is certified that error appears in the above-identified patent and that said Letters Patent is hereby corrected as shown below:

Claims

Claim 17, column 14, line 10, insert --,-- after "the bottom"

Signed and Sealed this
Eighth Day of December, 2015

Michelle K. Lee
*Director of the United States Patent and Trademark Office*